(12) United States Patent
Tobita

(10) Patent No.: US 8,429,523 B2
(45) Date of Patent: Apr. 23, 2013

(54) COMIC CREATION APPARATUS, COMIC CREATION METHOD, AND COMIC CREATION PROGRAM

(75) Inventor: Hiroaki Tobita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/908,254

(22) Filed: Oct. 20, 2010

(65) Prior Publication Data
US 2011/0138271 A1   Jun. 9, 2011

(30) Foreign Application Priority Data

Dec. 7, 2009  (JP) ................................ 2009-277848

(51) Int. Cl.
*G06F 17/00* (2006.01)

(52) U.S. Cl.
USPC ........... 715/240; 715/205; 715/243; 715/246; 715/715

(58) Field of Classification Search .................. 715/246, 715/200, 201, 202, 204, 205, 206, 207, 209, 715/234, 238, 240, 243, 244, 245, 255, 256, 715/264, 273, 715, 760, 203, 210, 251, 254, 715/274, 700, 731, 762, 789, 808, 856
See application file for complete search history.

(56) References Cited

U.S. PATENT DOCUMENTS

| | | | | |
|---|---|---|---|---|
| 6,064,383 A | * | 5/2000 | Skelly | 715/758 |
| 6,069,622 A | * | 5/2000 | Kurlander | 715/753 |
| 6,232,966 B1 | * | 5/2001 | Kurlander | 715/764 |
| 6,792,450 B1 | * | 9/2004 | Wakatsuki | 709/217 |
| 6,937,241 B2 | * | 8/2005 | Minagawa et al. | 345/473 |
| 2002/0122039 A1 | * | 9/2002 | Minagawa et al. | 345/473 |
| 2005/0039138 A1 | * | 2/2005 | Urbina | 715/802 |
| 2006/0258419 A1 | * | 11/2006 | Winkler et al. | 463/1 |
| 2006/0259857 A1 | * | 11/2006 | Atkins | 715/517 |
| 2008/0077857 A1 | * | 3/2008 | Olson | 715/246 |
| 2008/0301578 A1 | * | 12/2008 | Olson | 715/802 |
| 2009/0135198 A1 | * | 5/2009 | Lee et al. | 345/619 |
| 2009/0150760 A1 | * | 6/2009 | Winkler et al. | 715/202 |
| 2010/0110080 A1 | * | 5/2010 | Goodinson | 345/467 |
| 2010/0255906 A1 | * | 10/2010 | Chen | 463/31 |

FOREIGN PATENT DOCUMENTS

| | | | |
|---|---|---|---|
| EP | 1237124 A2 | * | 4/2002 |
| JP | 2005-38164 | | 2/2005 |

OTHER PUBLICATIONS

Kurlander et al., "Comic Chart", ACM, 1996, pp. 225-236.*

* cited by examiner

*Primary Examiner* — Maikhanh Nguyen
(74) *Attorney, Agent, or Firm* — Oblon, Spivak, McClelland, Maier & Neustadt, L.L.P.

(57) ABSTRACT

A comic creation apparatus includes a frame candidate setting unit configured to set, as frame candidates, candidates of a frame to be arranged adjacent to a frame arranged on a page of a comic, a frame candidate display unit configured to display the set frame candidates in a desired location on the page, and a frame determination unit configured to arrange a frame candidate selected from among the frame candidates displayed on the page in the desired location on the page as a frame.

10 Claims, 18 Drawing Sheets

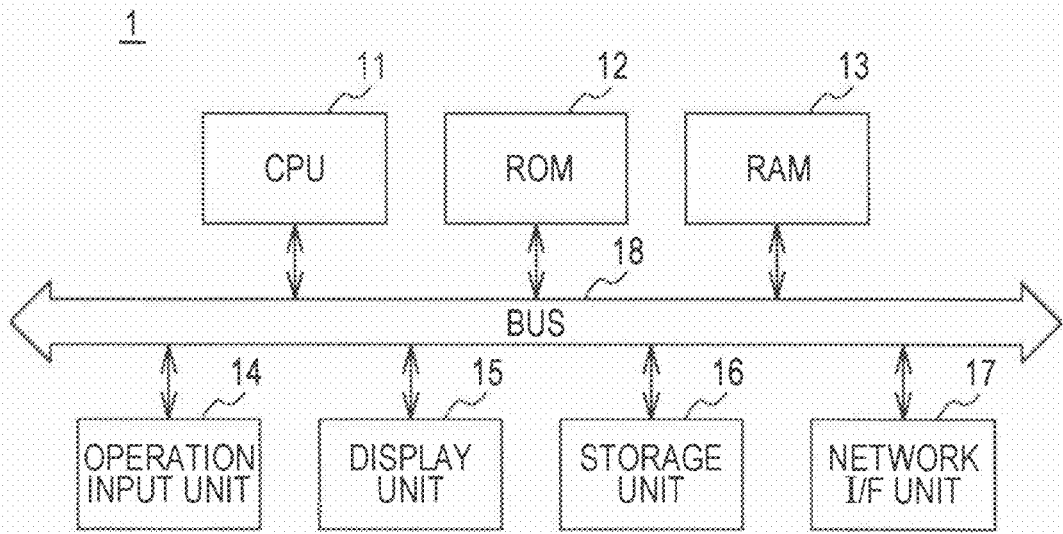
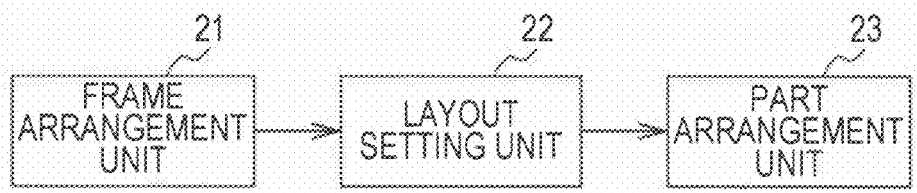

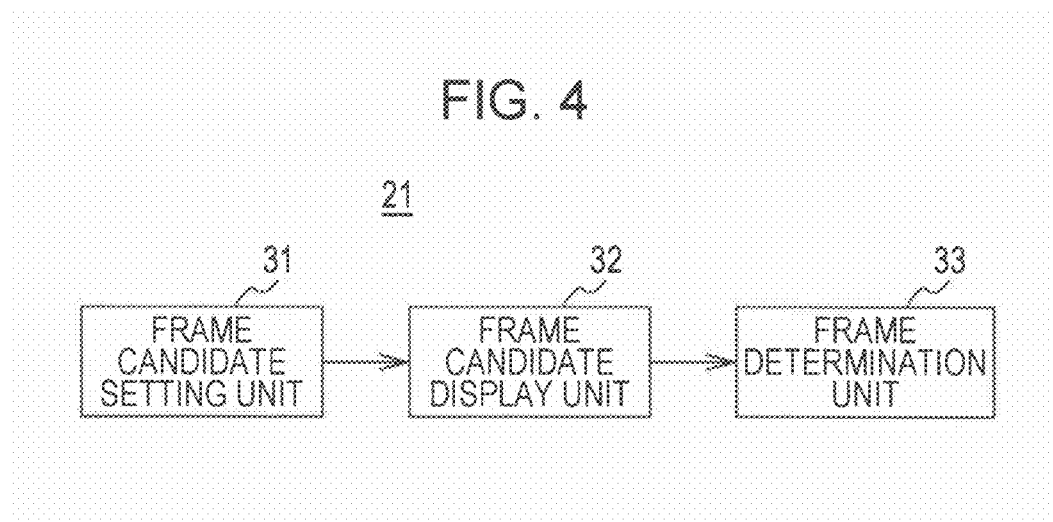

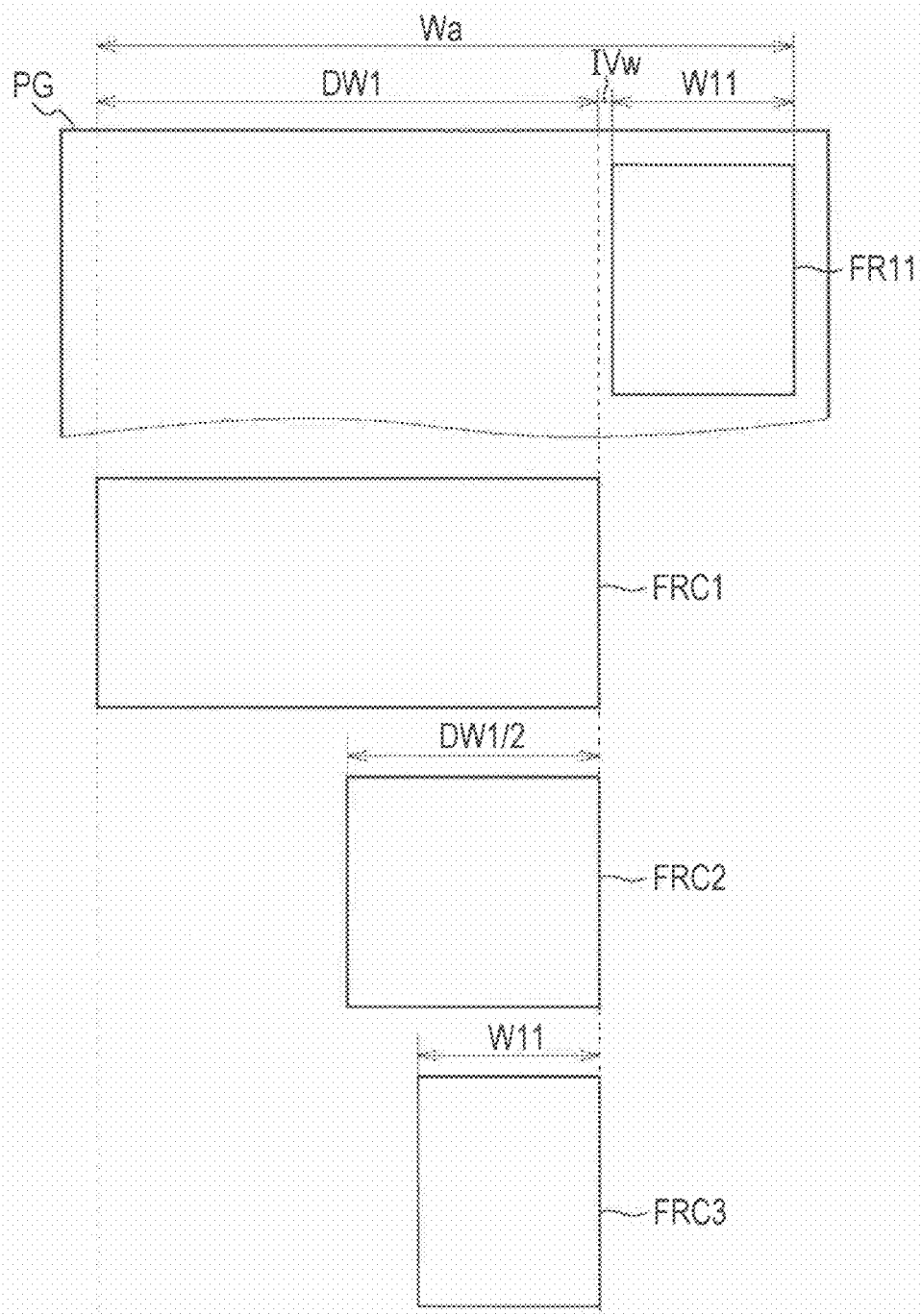

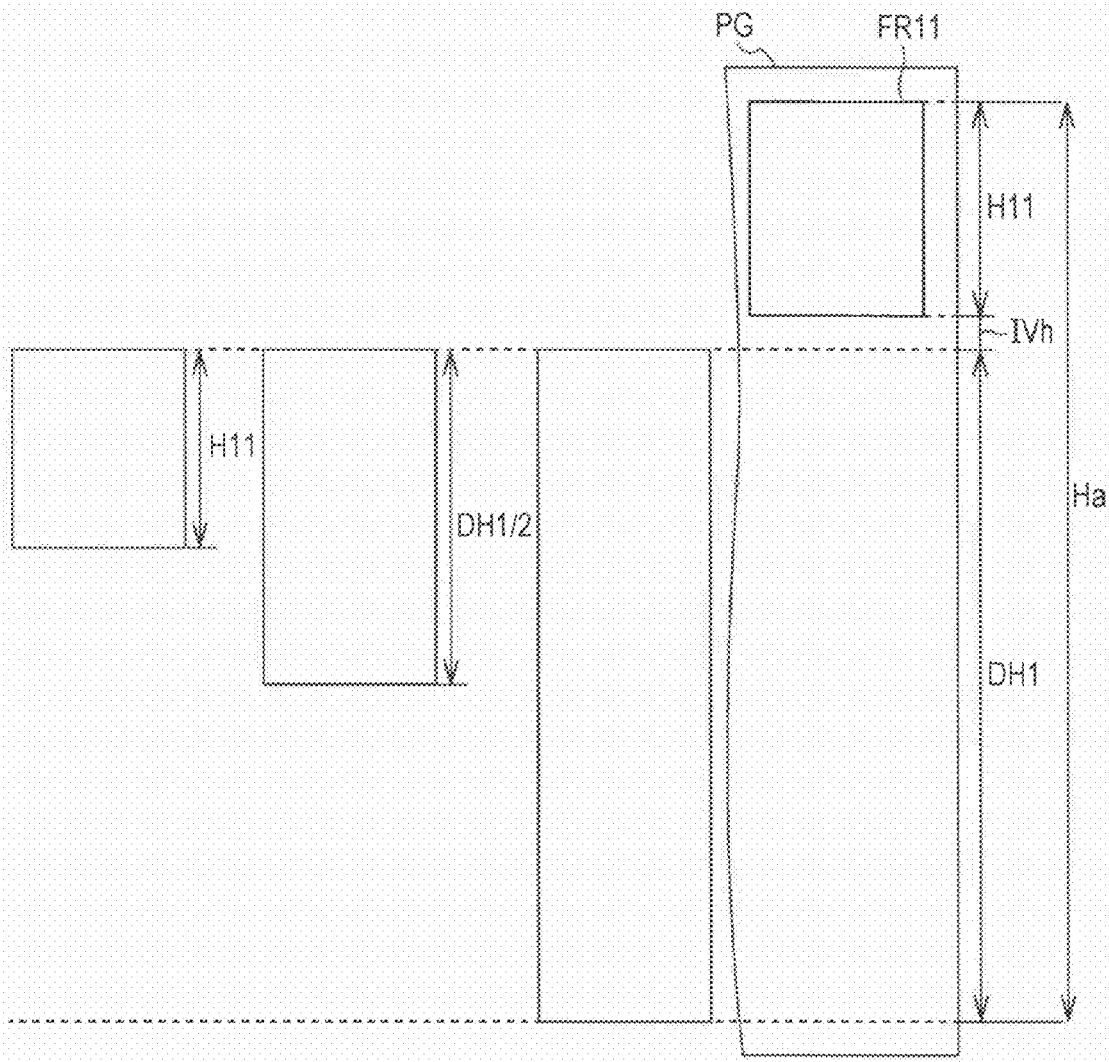

COMIC CREATION APPARATUS, COMIC CREATION METHOD, AND COMIC CREATION PROGRAM

BACKGROUND OF THE INVENTION

1. Field of the Invention

The present invention relates to a comic creation apparatus, a comic creation method, and a comic creation program that are suitable for use in the creation of, for example, a comic using a personal computer.

2. Description of the Related Art

In the related art, comic creation apparatuses configured to, when creating a comic, generate a page by arranging a plurality of frames having preset shapes and to cause a user to change the shapes of the arranged frames have been proposed (see, for example, Japanese Unexamined Patent Application Publication No. 2005-38164).

Comic creation apparatuses configured to generate a page by arranging frames specified by a user from among a plurality of frame candidates having different shapes are also available.

SUMMARY OF THE INVENTION

Actually, in comics, methods such as making the widths of vertically arranged frames different or making the interval between horizontally arranged frames shorter than that between vertically arranged frames in order to cause the line of sight of the reader to move in the direction intended by the writer are adopted.

However, when adopting such methods, the comic creation apparatuses described above may cause a user to perform time-consuming operations such as changing the shape of frames in accordance with the above methods and selecting frames to be arranged in accordance with the methods. Therefore, the above comic creation apparatuses do not facilitate easy creation of comics.

It is therefore desirable to provide a comic creation apparatus, a comic creation method, and a comic creation program that allow easy creation of comics.

According to an embodiment of the present invention, a comic creation apparatus includes a frame candidate setting unit configured to set, as frame candidates, candidates of a frame to be arranged adjacent to a frame arranged on a page of a comic, a frame candidate display unit configured to display the set frame candidates in a desired location on the page, and a frame determination unit configured to arrange a frame candidate selected from among the frame candidates displayed on the page in a desired location on the page as a frame.

According to another embodiment of the present invention, a comic creation method includes the steps of setting, as frame candidates, candidates of a frame to be arranged adjacent to a frame arranged on a page of a comic, displaying the set frame candidates in a desired location on the page, and arranging a frame candidate selected from among the frame candidates displayed on the page in a desired location on the page as a frame.

According to another embodiment of the present invention, a comic creation program causes a computer to execute the steps of setting, as frame candidates, candidates of a frame to be arranged adjacent to a frame arranged on a page of a comic, displaying the set frame candidates in a desired location on the page, and arranging a frame candidate selected from among the frame candidates displayed on the page in a desired location on the page as a frame.

According to the embodiments of the present invention, once one of frame candidates displayed in a desired location around a frame is selected, a frame is arranged in the desired location. Thus, frames can be easily arranged on a page. Therefore, a comic creation apparatus, a comic creation method, and a comic creation program that allow easy creation of a comic can be achieved.

BRIEF DESCRIPTION OF THE DRAWINGS

FIG. 1 is a schematic diagram illustrating a comic creation apparatus;

FIG. 2 is a schematic diagram illustrating the functional configuration of a CPU;

FIG. 4 is a schematic diagram illustrating the configuration of a frame arrangement unit;

FIG. 7 is a schematic diagram illustrating dimensions of widths of frame candidates;

FIG. 8 is a schematic diagram illustrating dimensions of heights of frame candidates;

DESCRIPTION OF THE PREFERRED EMBODIMENTS

Figure 3:
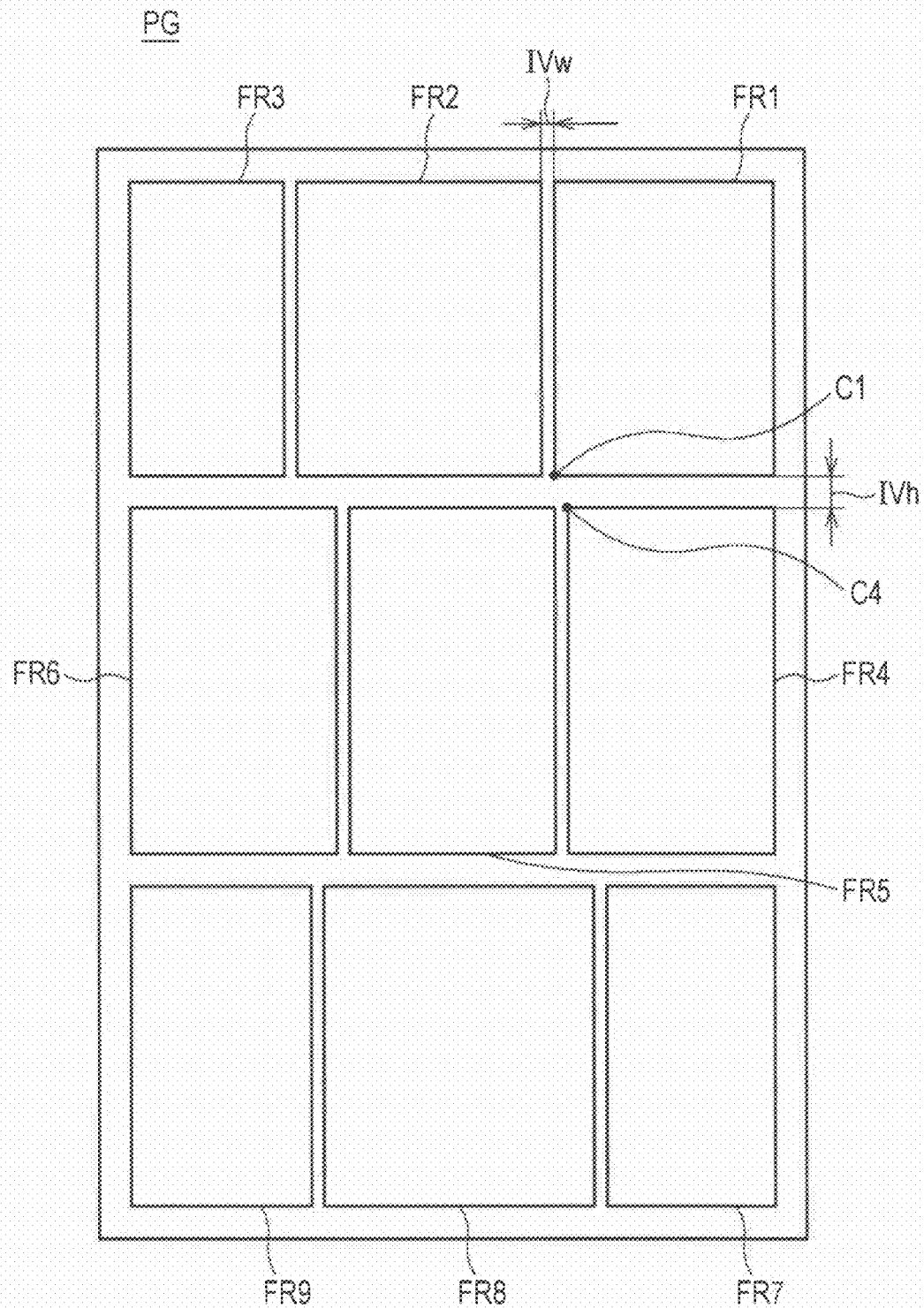
FIG. 3 is a schematic diagram illustrating an example of the arrangement of frames on a page.

Embodiments of the present invention will be described hereinafter. The description will be given in the following order:

1. Embodiment
2. Other Embodiments

1. Embodiment 1-1. Configuration of Comic Creation Apparatus

FIG. 1 illustrates a comic creation apparatus 1 according to an embodiment of the present invention. The comic creation apparatus 1 includes a central processing unit (CPU) 11, a read only memory (ROM) 12, a random access memory (RAM) 13, an operation input unit 14, a display unit 15, a storage unit 16, and a network interface (I/F) unit 17, which are connected to one another via a bus 18.

The CPU 11 integrally controls the overall operation of the comic creation apparatus 1 by extending a basic program stored in the ROM 12 onto the RAM 13 serving as a work memory and by executing the basic program. The CPU 11 also executes various programs by extending application programs stored in the ROM 12 or the storage unit 16 onto the RAM 13 and by executing the application programs.

The operation input unit 14 may be implemented by a mouse, a keyboard, a touch panel, or the like. The display unit 15 may be implemented by a liquid crystal display, an organic electroluminescent (EL) display, a cathode ray tube (CRT) display, or any other suitable display. The storage unit 16 may be implemented by a magnetic disk, a flash memory, or any other suitable device.

The network interface unit 17 may be implemented by an interface including a wired local area network (LAN) interface and a wireless LAN interface such as an Institute of Electrical and Electronics Engineers (IEEE) 802.11a/b/g/n interface. The network interface unit 17 transmits and receives various information to and from an external apparatus via using wired or wireless communication over a network such as the Internet.

1-2. Comic Creation Process

The CPU 11 executes a comic creation process by extending a comic creation program stored in the ROM 12 or the storage unit 16 onto the RAM 13 and by executing the comic creation program. When executing the comic creation process, as illustrated in FIG. 2, the CPU 11 serves as a frame arrangement unit 21, a layout setting unit 22, and a part arrangement unit 23.

The frame arrangement unit 21 executes a frame arrangement process described in detail below. The frame arrangement unit 21 sets frame candidates (hereinafter also referred to as "frame candidates") to be arranged adjacent to a frame in accordance with rules (hereinafter referred to as "frame arrangement rules") for arranging frames on a page so as to control the line of sight of the user to follow the desired path. Then, the frame arrangement unit 21 displays the frame candidates so as to overlap in a desired location where the frame is to be arranged on the page, and arranges a frame candidate selected from among the displayed frame candidates through the operation input unit 14 as a frame in this location.

The layout setting unit 22 executes a layout setting process described in detail below. When a frame arranged on a page is selected using the operation input unit 14, the layout setting unit 22 sets and displays layout candidates that are possible layouts in which a character and a speech balloon to be arranged in the frame can possibly be arranged. Then, the layout setting unit 22 arranges a character and a speech balloon in the frame with the layout indicated by a layout candidate selected using the operation input unit 14.

The part arrangement unit 23 executes a part arrangement process described in detail below, and arranges a plurality of parts registered in advance, which are selected using the operation input unit 14, for the character arranged in the frame by the layout setting unit 22. The part arrangement unit 23 also arranges text input using the operation input unit 14 in the speech balloon.

1-3. Frame Arrangement Rules

The frame arrangement rules will now be described. As illustrated in FIG. 3, a page PG of a comic generally has a plurality of frames FR (FR1 to FR9) arranged thereon.

The first frame arrangement rule may be that the number of frames to be arranged in one page PG is up to three vertical frames by three horizontal frames, that is, up to nine frames. This rule is based on the movement of the line of sight of the reader and comic readability, and any number of frames less than or equal to three vertical frames by three horizontal frames, that is, nine frames, may be used.

In general, the reader reads the page PG in the horizontal direction. Specifically, the reader may sequentially read the page PG from the frame FR1 located in the upper right corner to the frames FR2 and FR3 located to the left of the frame FR1. Upon completion of reading of all the frames FR1, FR2 and FR3 in the first row, the line of sight is moved to the frame FR4 located at the right end in the subsequent row, and the reader reads the frames FR4, FR5, and FR6 in this order, followed by the frames FR7, FR8, and FR9 in the subsequent row in this order.

In a case where the line of sight is moved horizontally and the frames are sequentially read in the above manner, it is desirable that non-outermost corners of the frames FR arranged vertically among the frames FR arranged on the page PG be located at positions displaced in the horizontal direction. Specifically, the lower left corner C1 of the frame FR1 and the upper left corner C4 of the frame FR4, which are arranged vertically, are located at positions displaced with respect to each other in the horizontal direction. This can control the line of sight of the reader to move in the horizontal direction.

The reader may also read the page PG in the vertical direction. In this case, the reader sequentially reads the page PG from the frame FR1 located in the upper right corner of the page PG to the frames FR4 and FR7 located below the frame FR1. Upon completion of reading of all the frames FR1, FR4, and FR7 in the first column, the line of sight is moved to the frame FR2 located at the top in the subsequent column, and the reader reads the frames FR2, FR5, and FR8 in this order, followed by the frames FR3, FR6, and FR9 in the subsequent column in this order.

In a case where the line of sight is moved vertically and the frames are sequentially read in the above manner, it is desirable that the frames FR arranged vertically among the frames FR arranged on the page PG be made to have the same or substantially the same width and be located at positions aligned with or substantially aligned with each other in the horizontal direction. This can control the line of sight of the reader to move in the vertical direction.

Therefore, the second rule may apply to both situations where the frames FR arranged vertically are made to have the same and different widths and are located at positions aligned with each other and displaced with respect to each other in the horizontal direction in order to control the line of sight of the reader to move between the frames FR in the horizontal and vertical directions.

The third rule may be that an interval IVw between the horizontally arranged frames FR is made shorter than an interval IVh between the vertically arranged frames FR.

The frame arrangement unit 21 arranges the frames FR in accordance with the above three rules.

1-4. Frame Arrangement Process

As illustrated in FIG. 4, when executing the frame arrangement process, the frame arrangement unit 21 serves as a frame candidate setting unit 31, a frame candidate display unit 32, and a frame determination unit 33.

Figure 5A:
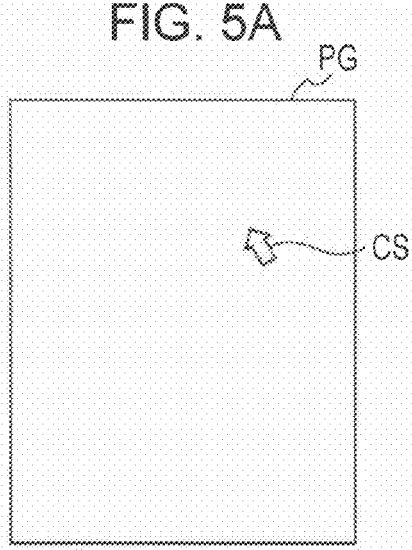
FIGS. 5A to 5F are schematic diagrams illustrating the arrangement (1) of frames.

As illustrated in FIG. 5A, the frame candidate setting unit 31 displays, on the display unit 15, a blank page PG on which no frames FR are arranged and a cursor CS that receives a user operation in accordance with the operation of the operation input unit 14.

Figure 5B:
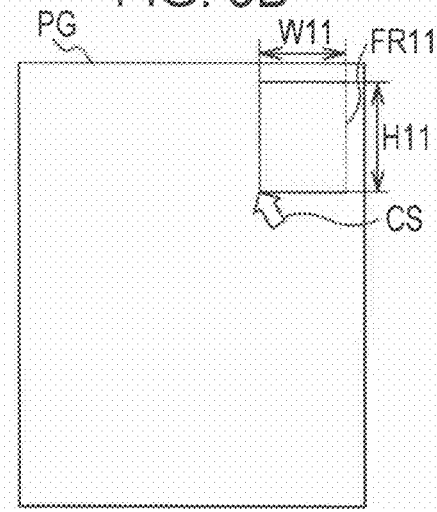

As illustrated in FIG. 5B, when a frame FR11 having a desired size and location is input to the blank page PG using the cursor CS, the frame candidate setting unit 31 detects the width W11 and height H11 of the frame FR11.

The frame candidate setting unit 31 also calculates, as illustrated in FIG. 7, a width (hereinafter also referred to as a "layout-enabled width") DW1 of a portion where frames FR can be arranged from a position that is located away from the left side of the frame FR11 by the interval IVw to the left edge of the page PG.

In this embodiment, a blank area where no frames FR are arranged is provided in the outer periphery of the page PG, and the layout-enabled width DW and the layout-enabled height (described below) DH of a frame FR are calculated within an area where the frame FR can be arranged, except for the blank area, on the page PG. However, in an embodiment of the present invention, the blank area may not necessarily be provided on the page PG.

The frame candidate setting unit 31 may set, for example, three frame candidates FRC that can be arranged to the left of the frame FR11 in accordance with the width W11 and the height H11 of the frame FR11 input by the user and the layout-enabled width DW1.

Specifically, when the layout-enabled width DW1 is greater than or equal to a threshold (hereinafter referred to as a "minimum width threshold") that is set to a minimum width for displaying a frame FR, the frame candidate setting unit 31 sets a frame candidate FRC1 whose width is the same as the layout-enabled width DW1 and whose height is the same as the height H11 of the frame FR11.

When the half length of the layout-enabled width DW1 is greater than or equal to the minimum width threshold, the frame candidate setting unit 31 further sets a frame candidate FRC2 whose width is half the layout-enabled width DW1 and whose height is the same as the height H11 of the frame FR11.

When the layout-enabled width DW1 is greater than or equal to the width W11 of the frame FR11, the frame candidate setting unit 31 further sets a frame candidate FRC3 whose height and width are the same as the height H11 and width W11 of the frame FR11, respectively.

The frame candidate setting unit 31 also calculates, as illustrated in FIG. 8, a height (hereinafter also referred to as a "layout-enabled height") DH1 of a portion where frames FR can be arranged from a position that is located away from the bottom side of the frame FR11 by the interval IVh to the bottom edge of the page PG.

The frame candidate setting unit 31 may set, for example, nine frame candidates FRC to be arranged below the frame FR11, which are the combination of three widths and three heights, using the width W11 and the height H11 of the frame FR11 and the layout-enabled height DH1.

Specifically, the frame candidate setting unit 31 calculates a width that is the same as the width Wa from the right edge to the left edge of the page PG, a width produced by multiplying the width W11 of the frame FR11 by a predetermined magnification factor, and a width that is the same as the width W11 of the frame FR11. The predetermined magnification factor may be set to, for example, a magnification factor less than 1 (for example, 0.8) when the width W of a frame FR arranged above the target frame is greater than or equal to a predetermined threshold, and to a magnification factor greater than 1 (for example, 1.2) when the width W of the frame FR is less than the predetermined threshold.

The frame candidate setting unit 31 further calculates a height that is the same as the layout-enabled height DH1, a height that is half the layout-enabled height DH1, and a height that is the same as the height H11 of the frame FR11.

The frame candidate setting unit 31 sets frame candidates FRC4 to FRC12 that are produced by the combination of the calculated three widths and heights.

Here, the frame candidate FRC4 has the same width as the width Wa that is a length from the right edge to the left edge of the page PG, and has the same height as the layout-enabled height DH1. The frame candidate FRC5 has the same width as the width Wa that is a length from the right edge to the left edge of the page PG, and has a height that is a half the layout-enabled height DH1. The frame candidate FRC6 has the same width as the width Wa that is a length from the right edge to the left edge of the page PG, and has the same height as the height H11 of the frame FR11.

The frame candidate FRC7 has a width equal to a length produced by multiplying the width W11 of the frame FR11 by a predetermined magnification factor, and has the same height as the layout-enabled height DH1. The frame candidate FRC8 has a width equal to the length produced by multiplying the width W11 of the frame FR11 by the predetermined magnification factor, and has a height that is half the layout-enabled height DH1. The frame candidate FRC9 has a width equal to the length produced by multiplying the width W11 of the frame FR11 by the predetermined magnification factor, and has the same height as the height H11 of the frame FR11.

The frame candidate FRC10 has the same width as the width W11 of the frame FR11, and has the same height as the layout-enabled height DH1. The frame candidate FRC11 has the same width as the width W11 of the frame FR11, and has a height that is half the layout-enabled height DH1. The frame candidate FRC12 has the same width as the width W11 of the frame FR11, and has the same height as the height H11 of the frame FR11.

Figure 5C:
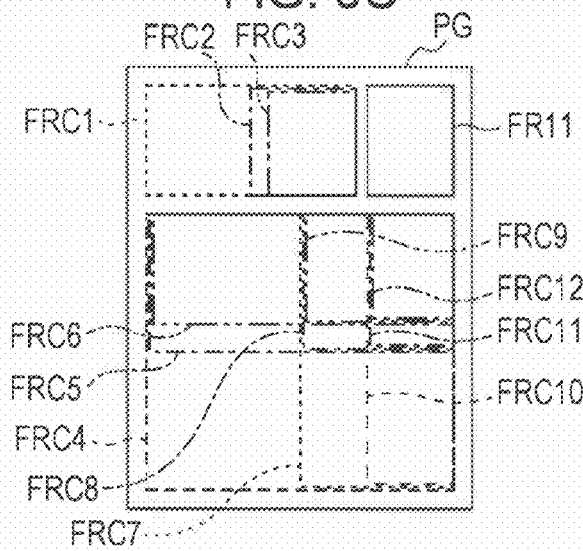

The frame candidate display unit 32 displays, as illustrated in FIG. 5C, the frame candidates FRC1 to FRC12 set by the frame candidate setting unit 31 in the desired location. That is, the frame candidate display unit 32 displays the frame candidates FRC1 to FRC3 at positions that are located to the left of the frame FR11 away therefrom by the interval IVw in such a manner that the frame candidates FRC1 to FRC3 overlap each other with the upper right corners thereof aligned with each other. The frame candidate display unit 32 further displays the frame candidates FRC4 to FRC12 at positions that are located below the frame FR11 away therefrom by the interval IVh in such a manner that the frame candidates FRC4 to FRC12 overlap each other with the upper right corners thereof aligned with each other.

Figure 5D:
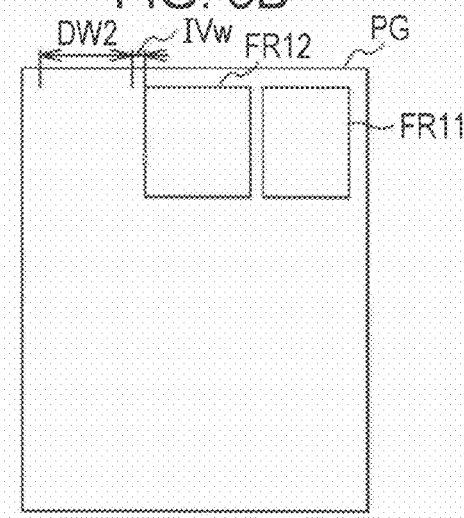

For example, when the frame candidate FRC3 is selected using the cursor CS, as illustrated in FIG. 5D, the frame determination unit 33 arranges the frame candidate FRC3 as a frame FR12 so as to be located to the left of the frame FR11.

If a portion of the frame candidate FRC1 on the left side of the frame candidate FRC2 is selected, the frame determination unit 33 recognizes that the frame candidate FRC1 has been selected. Further, if a portion of the frame candidate FRC2 on the left side of the frame candidate FRC3 is selected, the frame determination unit 33 recognizes that the frame candidate FRC2 has been selected. If the frame candidate FRC3 is selected, the frame determination unit 33 recognizes that the frame candidate FRC3 has been selected.

When the frame FR12 is arranged, the frame candidate setting unit 31 calculates a layout-enabled width DW2 from a position that is located away from the left side of the frame FR12 by the interval IVw to the left edge of the page PG.

Figure 5E:
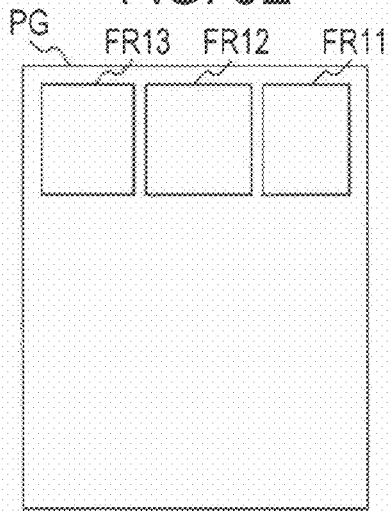

When the calculated layout-enabled width DW2 is greater than or equal to the minimum width threshold, as illustrated in FIG. 5E, the frame determination unit 33 arranges a frame FR13 whose width is the same as the layout-enabled width DW2 and whose height is the same as the height H11 of the frame FR11 so as to be located to the left of the frame FR12.

Figure 5F:
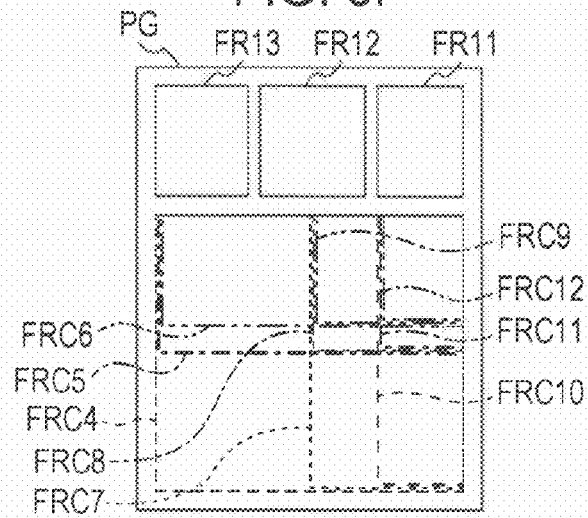

When the frames FR11 to FR13 in the first row are arranged on the page PG, the frame candidate setting unit 31 sets the frame candidates FRC4 to FRC12 that can be arranged at the right end in the subsequent row. Then, as illustrated in FIG. 5F, the frame candidate display unit 32 displays the frame candidates FRC4 to FRC12 below the frame FR11 away therefrom by the interval IVh in such a manner that the frame candidates FRC4 to FRC12 overlap each other.

Figure 6A:
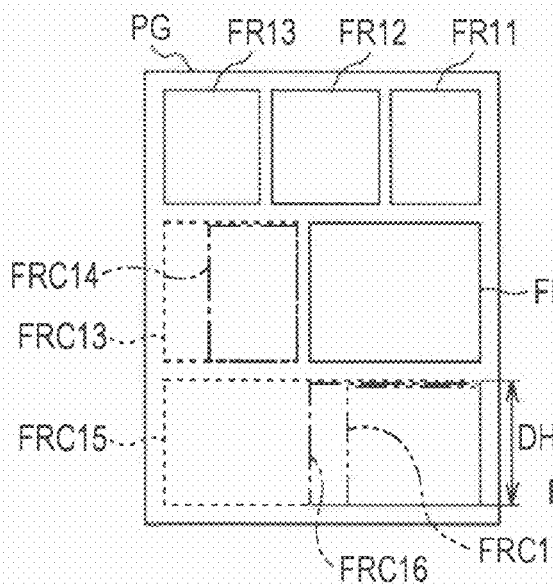
FIGS. 6A to 6D are schematic diagrams illustrating the arrangement (2) of frames.

For example, when the frame candidate FRC9 is selected using the cursor CS, as illustrated in FIG. 6A, the frame determination unit 33 arranges the frame candidate FRC9 as a frame FR14 below the frame FR11.

The frame candidate setting unit 31 detects a width W14 and height H14 (not illustrated) of the frame FR14 in a manner similar to that when the frame FR11 is input.

Then, the frame candidate setting unit 31 calculates a layout-enabled width DW3 (not illustrated) from a position that is located away from the left side of the frame FR14 by the interval IVw to the left edge of the page PG.

When the layout-enabled width DW3 is greater than or equal to the minimum width threshold, the frame candidate setting unit 31 sets a frame candidate FRC13 whose width is the same as the layout-enabled width DW3 and whose height is the same as the height H14 of the frame FR14. When the half length of the layout-enabled width DW3 is greater than or equal to the minimum width threshold, the frame candidate setting unit 31 sets a frame candidate FRC14 whose width is half the layout-enabled width DW3 and whose height is the same as the height H14 of the frame FR14.

The frame candidate setting unit 31 further calculates a layout-enabled height DH3 from a position that is located away from the bottom side of the frame FR14 by the interval IVh to the bottom edge of the page PG.

The frame candidate setting unit 31 sets a frame candidate FRC15 whose width is the same as the width Wa from the right edge to the left edge of the page PG and whose height is the same as the layout-enabled height DH3, in accordance with the calculated layout-enabled height DH3 and a minimum height threshold. The frame candidate setting unit 31 further sets a frame candidate FRC16 whose width is the same as the width W14 of the frame FR14 and whose height is the same as the layout-enabled height DH3. The frame candidate setting unit 31 also sets a frame candidate FRC17 whose width is equal to a length produced by multiplying the width W14 of the frame FR14 by a predetermined magnification factor and whose height is the same as the layout-enabled height DH3.

The frame candidate display unit 32 displays the frame candidates FRC13 to FRC17 set by the frame candidate setting unit 31 in the desired location. That is, the frame candidate display unit 32 displays the frame candidates FRC13 and FRC14 at positions that are located to the left of the frame FR14 away therefrom by the interval IVw in such a manner that the frame candidates FRC13 and FRC14 overlap each other, and also displays the frame candidates FRC15 to FRC17 at positions that are located below the frame FR14 away therefrom by the interval IVh in such a manner that the frame candidates FRC15 to FRC17 overlap each other.

Figure 6B:
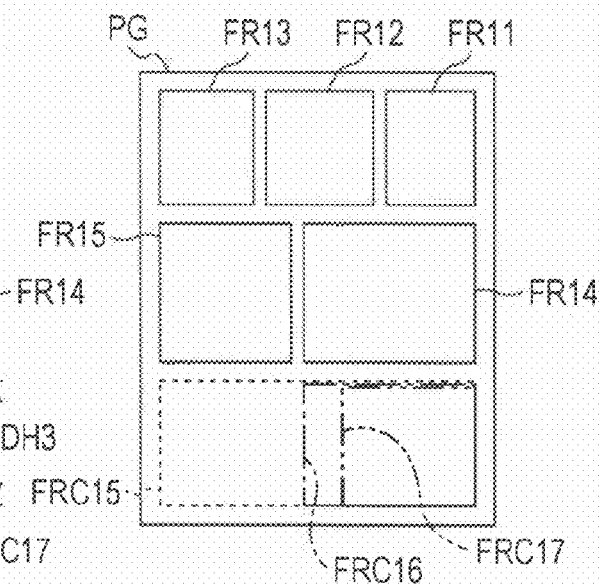

For example, when the frame candidate FRC13 is selected using the cursor CS, as illustrated in FIG. 6B, the frame determination unit 33 arranges the frame candidate FRC13 as a frame FR15 so as to be located to the left of the frame FR14.

The frame candidate setting unit 31 sets the frame candidates FRC15 to FRC17 as frame candidates that can be arranged below the frame FR14. The frame candidate display unit 32 displays the frame candidates FRC15 to FRC17 so as to be located below the frame FR14 away therefrom by the interval IVh in such a manner that the frame candidates FRC15 to FRC17 overlap each other.

Figure 6C:
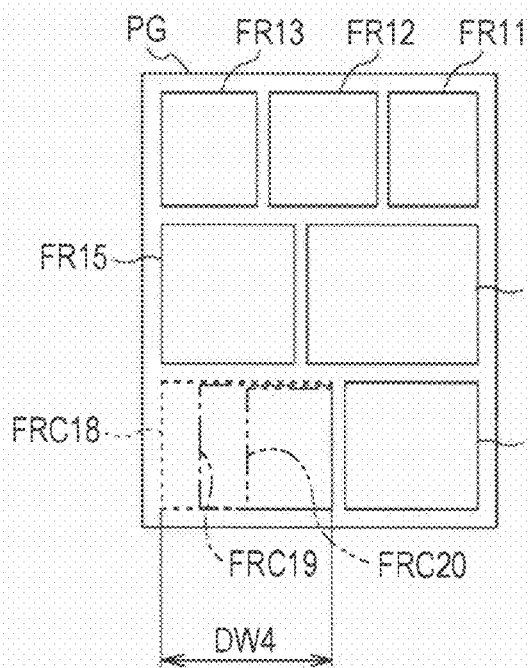

For example, when the frame candidate FRC17 is selected using the cursor CS, as illustrated in FIG. 6C, the frame determination unit 33 arranges the frame candidate FRC17 as a frame FR16 below the frame FR14.

The frame candidate setting unit 31 calculates a layout-enabled width DW4 from a position that is located away from the left side of the frame FR16 by the interval IVw to the left edge of the page PG.

The frame candidate setting unit 31 sets frame candidates that can be arranged to the left of the frame FR16, in accordance with the calculated layout-enabled width DW4 and the minimum width threshold. Specifically, the frame candidate setting unit 31 sets a frame candidate FRC18 whose width is the same as the layout-enabled width DW4 and whose height is the same as the height H16 of the frame FR16. The frame candidate setting unit 31 further sets a frame candidate FRC19 whose height and width are the same as the height H16 and width W16 of the frame FR16, respectively. The frame candidate setting unit 31 also sets a frame candidate FRC20 whose width is half the layout-enabled width DW4 and whose height is the same as the height H16 of the frame FR16.

The frame candidate display unit 32 displays the frame candidates FRC18 to FRC20 set by the frame candidate setting unit 31 so as to be located to the left of the frame FR16 away therefrom by the interval IVw in such a manner that the frame candidates FRC18 to FRC20 overlap each other.

Figure 6D:
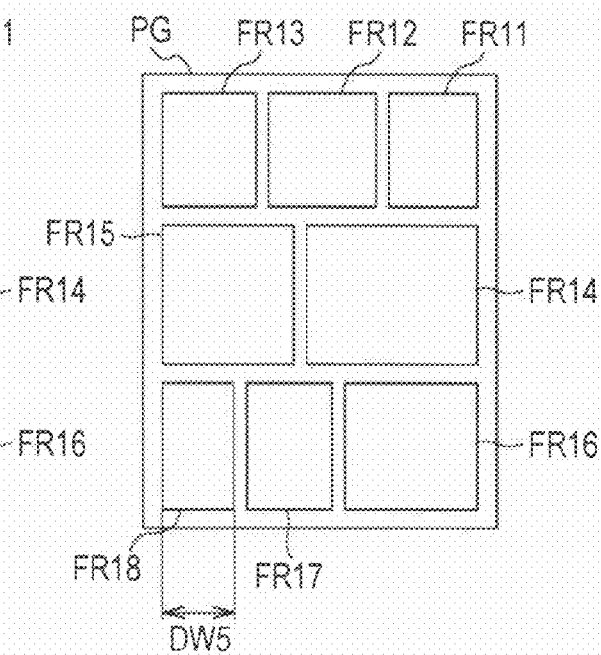

For example, when the frame candidate FRC20 is selected using the cursor CS, as illustrated in FIG. 6D, the frame determination unit 33 arranges the frame candidate FRC20 as a frame FR17 at the position left adjacent to the frame FR16.

When the frame FR17 is arranged, the frame candidate setting unit 31 calculates a layout-enabled width DW5 from a position that is located away from the left side of the frame FR17 by the interval IVw to the left edge of the page PG.

When the calculated layout-enabled width DW5 is greater than or equal to the minimum width threshold, the frame determination unit 33 arranges a frame FR18 whose width is equal to the calculated layout-enabled width DW5 and whose height is the same as the height H16 of the frame FR16 so as to be located to the left of the frame FR17.

If the frame FR14 is selected subsequently to the frame FR11, the frame candidate setting unit 31 sets the frame candidates FRC1 to FRC3 that can be arranged to the left of the frame FR11 and the frame candidates FRC13 to FRC17 that can be arranged to the left and below the frame FR14. Then, the frame candidate display unit 32 displays the frame candidates FRC1 to FRC3 and FRC13 to FRC17 so as to allow the user to select frames.

1-5. Layout Setting Process

Figure 9:
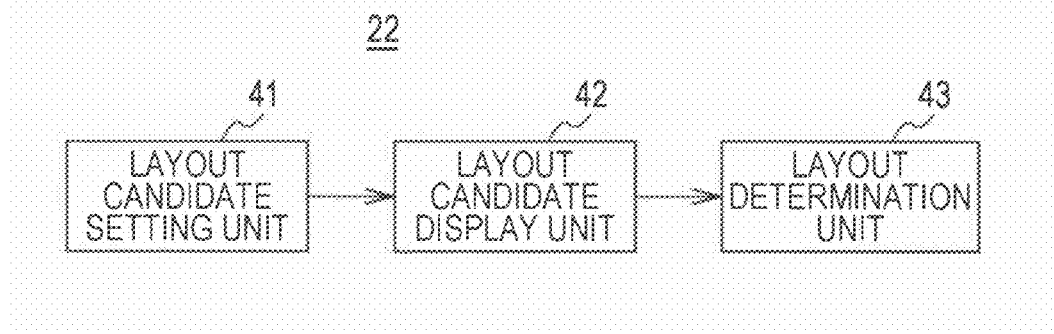
FIG. 9 is a schematic diagram illustrating the configuration of a layout setting unit.

When executing the layout setting process, as illustrated in FIG. 9, the layout setting unit 22 serves as a layout candidate setting unit 41, a layout candidate display unit 42, and a layout determination unit 43.

When the cursor CS is moved to a frame FR input by the user or a frame FR arranged by the frame arrangement unit 21, the layout candidate setting unit 41 detects the width W and height H of the frame FR.

The layout candidate setting unit 41 compares the width W and height H of the frame FR with the thresholds (hereinafter referred to as a "layout width threshold" and a "layout height threshold") that are set respectively for the width W and height H.

If the width W of the frame FR is smaller than the layout width threshold and if the height H of the frame FR is smaller than the layout height threshold, the layout candidate setting unit 41 sets layout candidates LA1 to LA4 (FIG. 10) as candidates of a layout.

Figure 10:
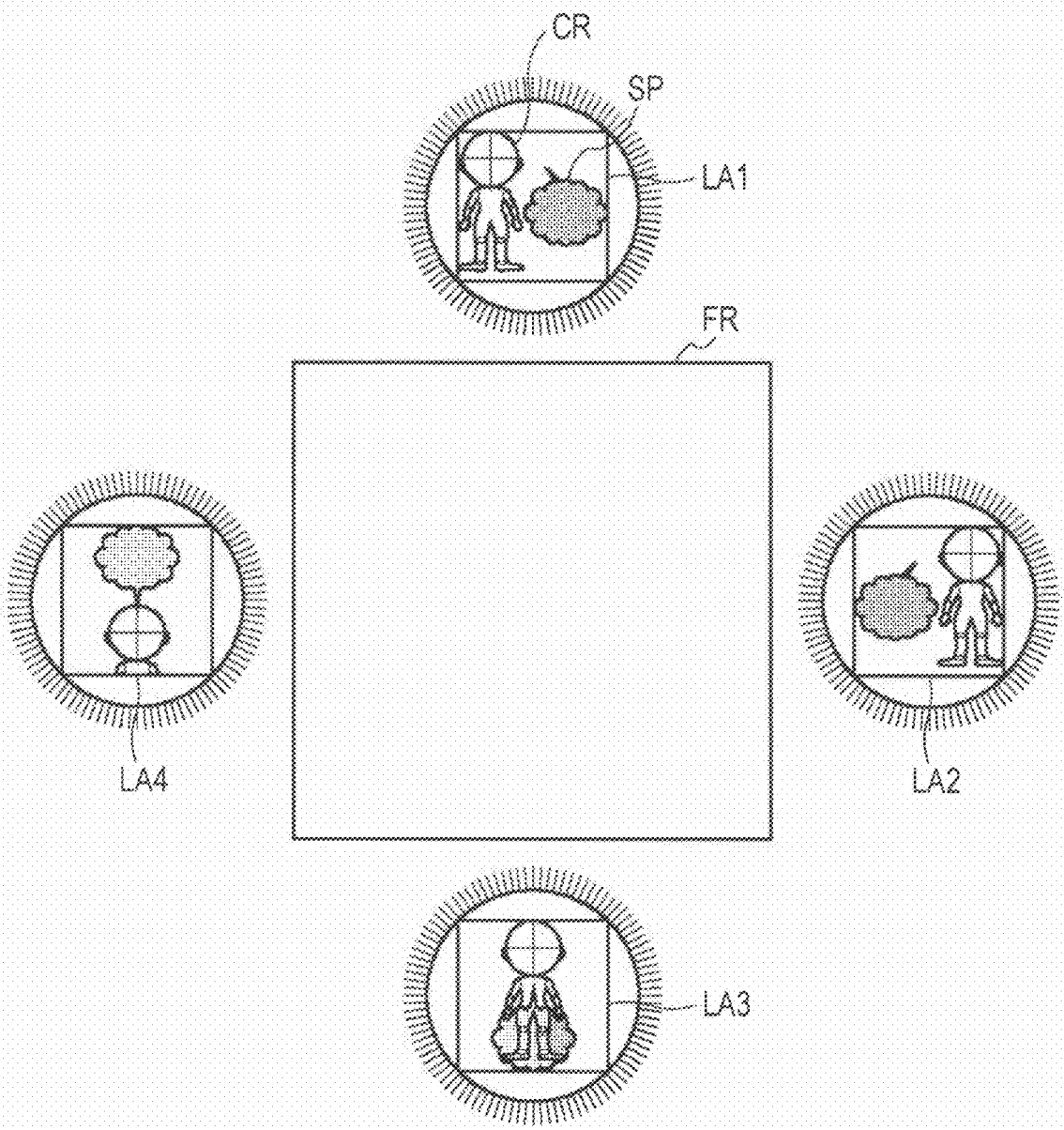
FIG. 10 is a schematic diagram illustrating an example (1) of displayed layout candidates.

As illustrated in FIG. 10, the layout candidate display unit 42 displays the layout candidates LA1 to LA4 set by the layout candidate setting unit 41 around the frame FR.

Here, the layout candidate LA1 is configured such that a character CR is placed in the left part and a speech balloon SP for representing the speech of the character CR is placed in the right part. The layout candidate LA2 is configured such that the character CR is placed in the right part and the speech balloon SP is placed in the left part. The layout candidate LA3 is configured such that the character CR is placed in the center part and the speech balloon SP is placed so as to overlap the body of the character CR. The layout candidate LA4 is configured such that the face of the character CR is placed in the lower center part and the speech balloon SP is placed above the character CR.

If the cursor CS is moved to one of the layout candidates LA1 to LA4 displayed around the frame FR, the layout determination unit 43 determines the one of the layout candidate LA1 to LA4 to which the cursor CS has been moved as a layout to be displayed in the frame FR.

Then, the layout determination unit 43 enlarges or reduces the selected one of the layout candidates LA1 to LA4 in accordance with the size of the frame FR, and displays a character CR and a speech balloon SP in the frame FR with the enlarged or reduced layout.

Figure 11:
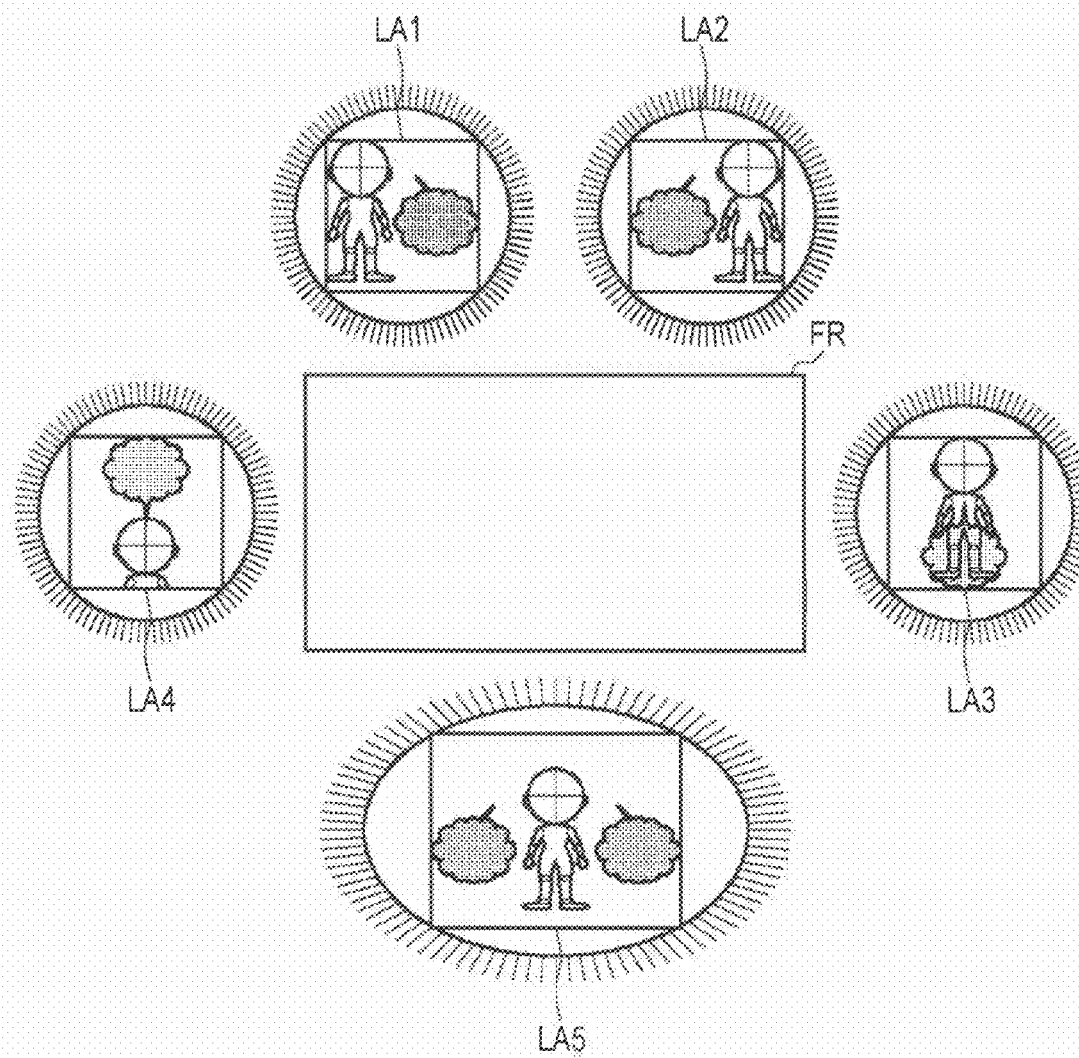
FIG. 11 is a schematic diagram illustrating an example (2) of displayed layout candidates.

If the width W of the frame FR is greater than or equal to the layout width threshold and if the height H of the frame FR is smaller than the layout height threshold, the layout candidate setting unit 41 sets layout candidates LA1 to LA5 (FIG. 11) as candidates of a layout. At this time, the layout candidate display unit 42 displays the layout candidates LA1 to LA5 set by the layout candidate setting unit 41 around the frame FR in the manner illustrated in FIG. 11.

Figure 12:
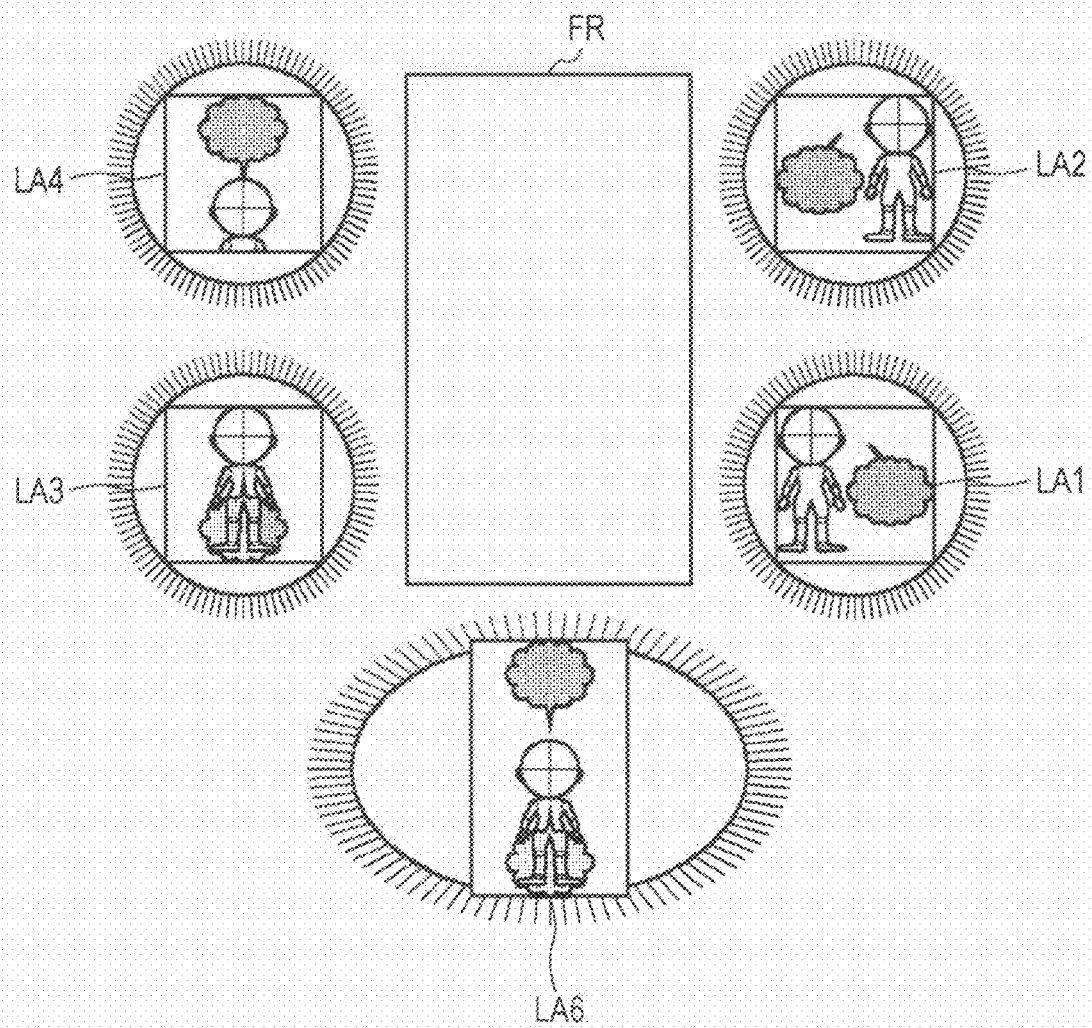
FIG. 12 is a schematic diagram illustrating an example (3) of displayed layout candidates.

Further, if the width W of the frame FR is smaller than the layout width threshold and if the height H of the frame FR is greater than or equal to the layout height threshold, the layout candidate setting unit 41 sets layout candidates LA1 to LA4 and LA6 (FIG. 12) as candidates of a layout. At this time, the layout candidate display unit 42 displays the layout candidates LA1 to LA4 and LA6 set by the layout candidate setting unit 41 around the frame FR in the manner illustrated in FIG. 12.

Figure 13:
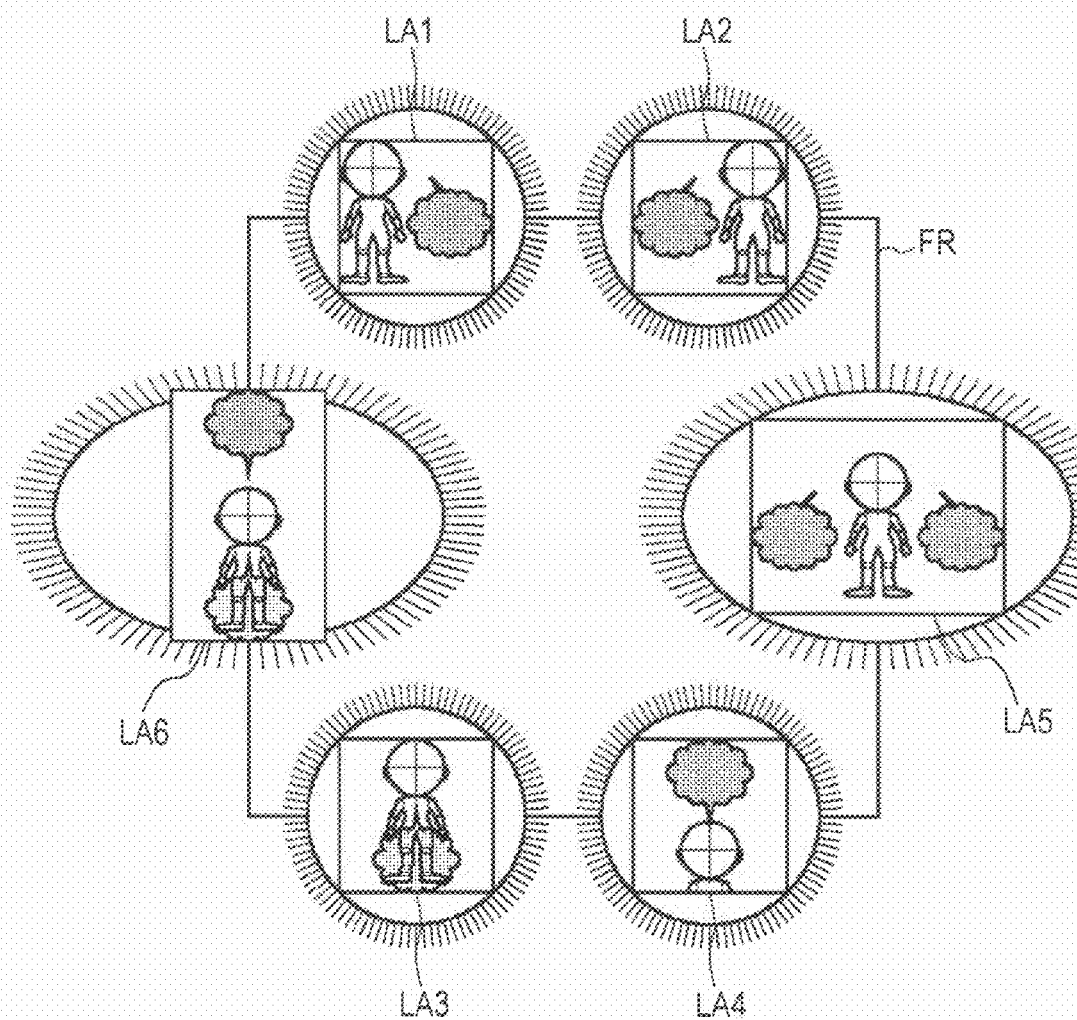
FIG. 13 is a schematic diagram illustrating an example (4) of displayed layout candidates.

Further, if the width W of the frame FR is greater than or equal to the layout width threshold and if the height H of the frame FR is greater than or equal to the layout height threshold, the layout candidate setting unit 41 sets layout candidates LA1 to LA6 (FIG. 13) as candidates of a layout. At this time, the layout candidate display unit 42 displays the layout candidates LA1 to LA6 set by the layout candidate setting unit 41 around the frame FR in the manner illustrated in FIG. 13.

When the cursor CS is moved to one of the layout candidates LA1 to LA6 displayed around the frame FR, the layout determination unit 43 determines the one of the layout candidates LA to which the cursor CS has been moved as a layout to be displayed in the frame FR. Then, the layout determination unit 43 enlarges or reduces the selected one of the layout candidates LA1 to LA6 in accordance with the size of the frame FR, and displays a character CR and a speech balloon SP in the frame FR with the enlarged or reduced layout.

Here, the layout candidate LA5 is configured such that a character CR is placed in the center part and speech balloons SP are placed to the left and right of the character CR. The layout candidate LA6 is configured such that the face of a character CR is placed in the center and speech balloons SP are placed above and below the face of the character CR.

The layout candidates LA1 to LA6 may be stored in the storage unit 16 in advance, and may be appropriately read and set by the layout candidate setting unit 41.

1-6. Part Arrangement Process

Figure 14:
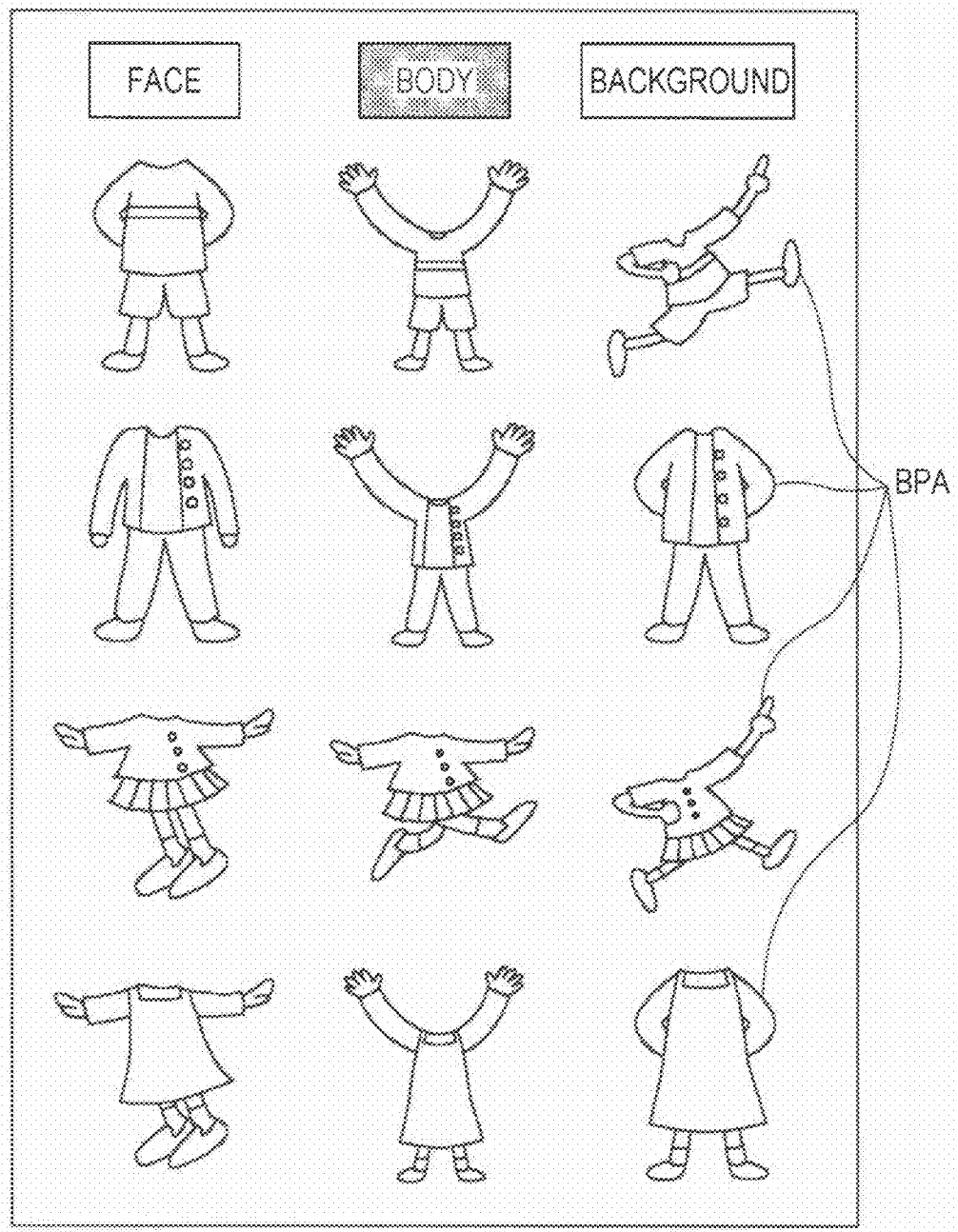
FIG. 14 is a schematic diagram illustrating a parts list screen.

The part arrangement unit 23 displays, as illustrated in FIG. 14, a parts list screen PAG together with the page PG. The parts list screen PAG is adapted to allow the user to select parts from among a plurality of parts registered in advance for the character CP and a background in the frame FR arranged by the layout setting unit 22.

For example, the part arrangement unit 23 may display a parts list screen PAG in which a plurality of body parts BPA of the character CR are displayed on the display unit 15. Then, the part arrangement unit 23 allows the user to drag and drop one of the body parts BPA to the body of the character CR displayed in the frame FR on the page PG, enlarges or reduces the designated part in accordance with the size of the body of the character CR, and arranges the enlarged or reduced part.

Similarly, for example, the part arrangement unit 23 displays a plurality of face parts (not illustrated) in the parts list screen PAG. Then, the part arrangement unit 23 allows the user to drag and drop one of the face parts to the face of the character CR displayed in the frame FR, enlarges or reduces the designated part in accordance with the size of the face of the character CR, and arranges the enlarged or reduced part.

Further, for example, the part arrangement unit 23 displays a plurality of background parts (not illustrated) in the parts list screen PAG, and allows the user to drag and drop one of the background parts to the frame FR on the page PG. Then, the part arrangement unit 23 enlarges or reduces the designated part in accordance with the size of the frame FR, and arranges the enlarged or reduced part.

After the speech balloon SP in the frame FR is selected using the cursor CS, the part arrangement unit 23 displays text input using the operation input unit 14 in the speech balloon SP.

1-7. Comic Creation Process Procedure

Next, the procedure of the comic creation process described above will be described with reference to flowcharts illustrated in FIGS. 15 to 19.

The CPU 11 enters a subroutine SRT1 (FIG. 16) from the start step in a routine RT1 (FIG. 15), and executes the frame arrangement process. Specifically, the CPU 11 enters step SP1 from the start step in the subroutine SRT1. In step SP1, the CPU 11 displays a blank page PG on the display unit 15, and prompts the user to input a frame FR having the desired location and size. Then, the CPU 11 proceeds to a subroutine SRT3.

In the subroutine SRT3 (FIG. 17), the CPU 11 enters step SP11 from the start step. In step SP11, the CPU 11 determines whether or not a target frame FR last arranged on the page PG is located at the right end on the page PG.

If a positive result is determined, the CPU 11 proceeds to step SP12, and calculates a layout-enabled width DW from a position that is located away from the left side of the target frame FR by the interval IVw to the left edge of the page PG. Then, the CPU 11 proceeds to step SP13.

In step SP13, the CPU 11 determines whether or not the layout-enabled width DW is greater than or equal to the minimum width threshold. If a positive result is determined, the CPU 11 proceeds to step SP14. If a negative result is determined, the CPU 11 proceeds to step SP15.

In step SP14, the CPU 11 sets a frame candidate FRC whose width is the same as the layout-enabled width DW and whose height is the same as the height H of the target frame FR. Then, the CPU 11 proceeds to step SP15.

In step SP15, the CPU 11 determines whether or not the half length of the layout-enabled width DW is greater than or equal to the minimum width threshold. If a positive result is determined, the CPU 11 proceeds to step SP16. If a negative result is determined, the CPU 11 proceeds to step SP17.

In step SP16, the CPU 11 sets a frame candidate FRC whose width is half the layout-enabled width DW and whose height is the same as the height H of the target frame FR. Then, the CPU 11 proceeds to step SP17.

Figure 16:
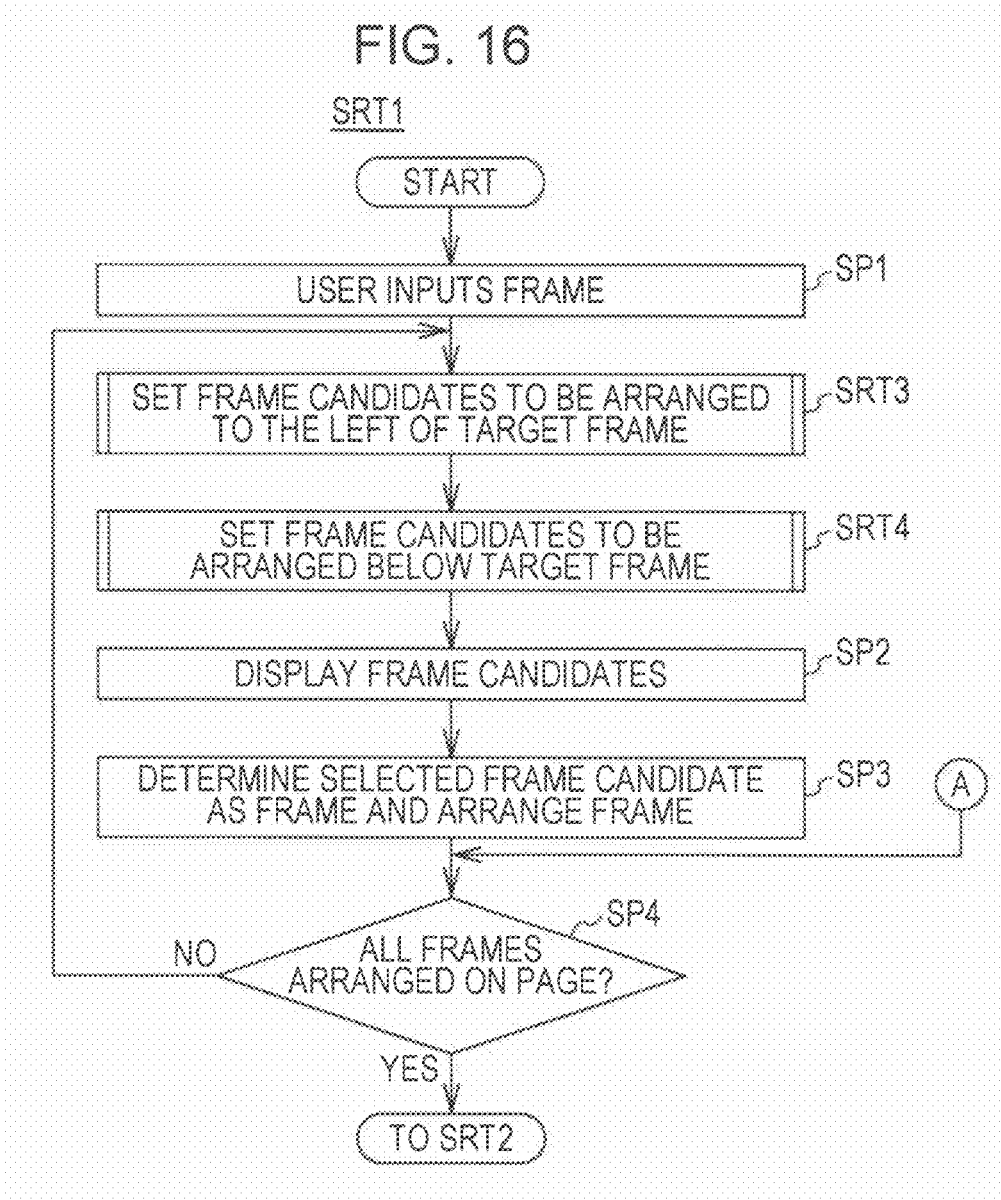
FIG. 16 is a flowchart describing a process procedure for arranging frames.
Figure 17:
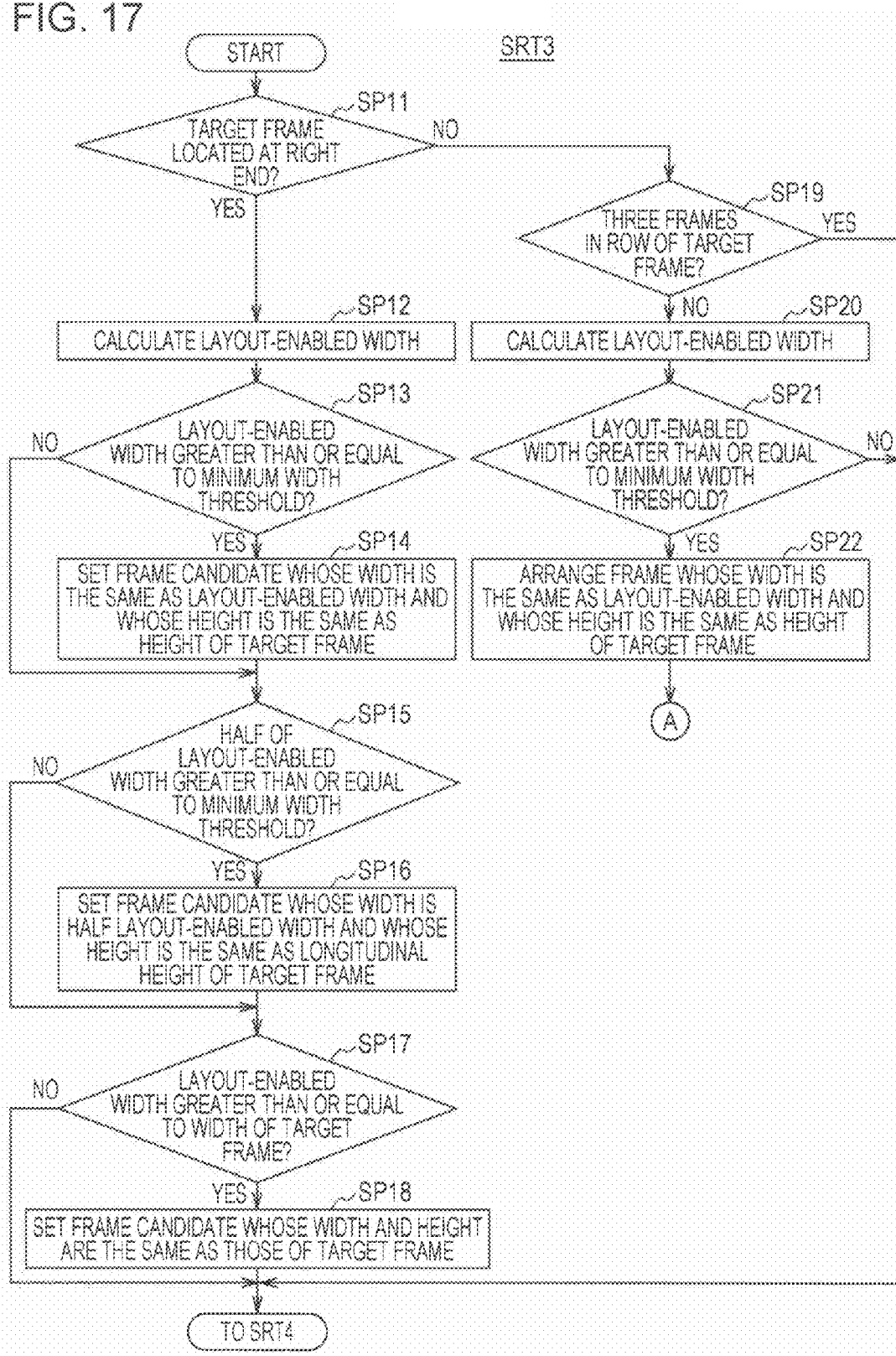
FIG. 17 is a flowchart describing a process procedure for setting frame candidates located to the left of a given frame.
Figure 18:
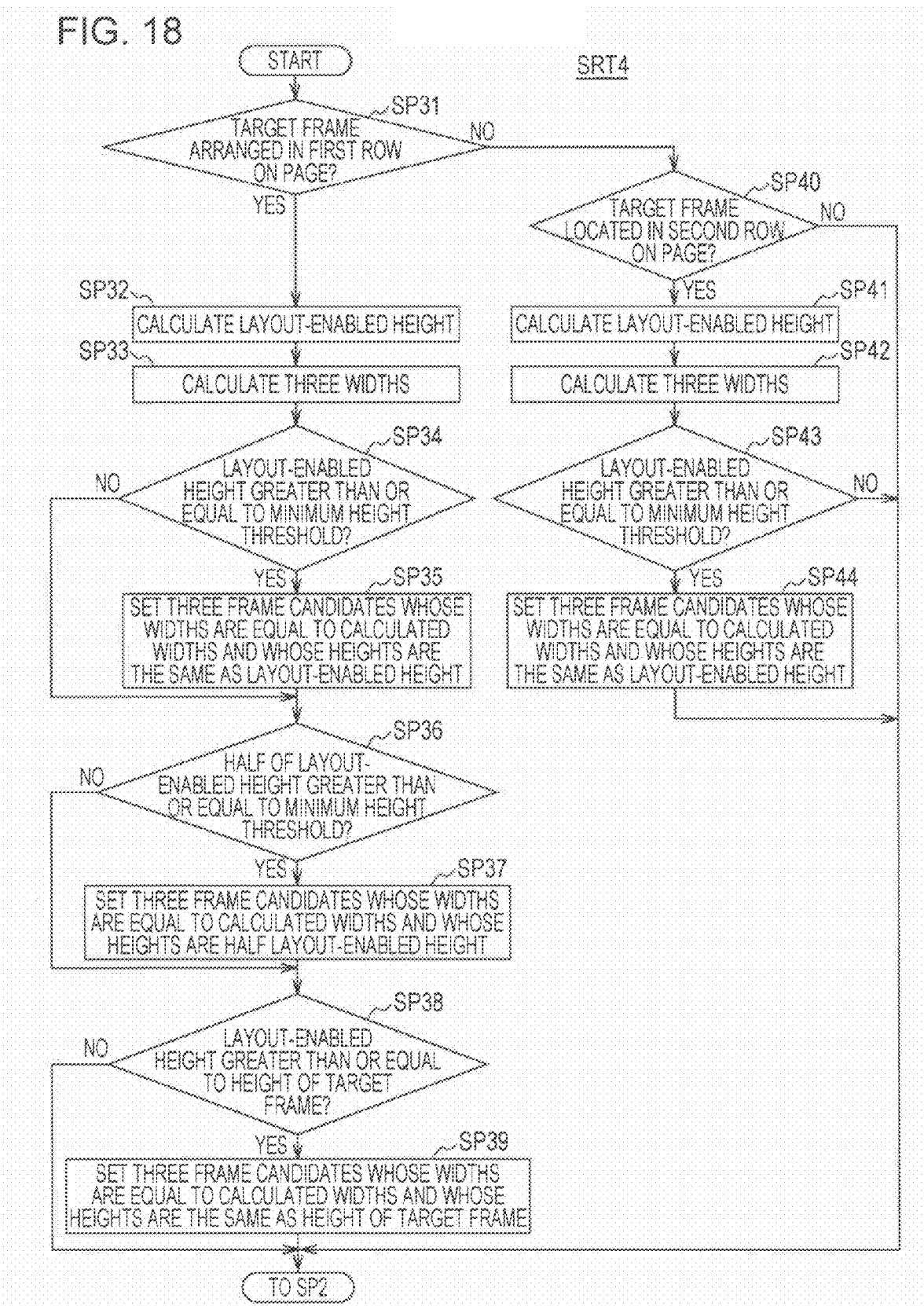
FIG. 18 is a flowchart describing a process procedure for setting frame candidates located below the given frame.

In step SP17, the CPU 11 determines whether or not the layout-enabled width DW is greater than or equal to the width W of the target frame FR. If a positive result is determined, the CPU 11 proceeds to step SP18. If a negative result is determined, the CPU 11 proceeds to a subroutine SRT4 (FIG. 16).

In step SP18, the CPU 11 sets a frame candidate FRC whose width and height are the same as the width W and height H of the target frame FR, respectively. Then, the CPU 11 proceeds to the subroutine SRT4.

If a negative result is determined in step SP11, then, the CPU 11 proceeds to step SP19, and determines whether or not three frames FR are present in the row in which the target frame FR is located.

If a positive result is determined here, this means that three frames FR are present in the row in which the target frame FR is located, and that no frame candidates FRC are set because no new frames FR can be arranged in this row. In this case, the CPU 11 proceeds to the subroutine SRT4.

If a negative result is determined in step SP19, this means that the target frame FR is the second frame from the right end in this row. In this case, the CPU 11 proceeds to step SP20.

In step SP20, the CPU 11 calculates a layout-enabled width DW from a position that is located away from the left side of the target frame FR by the interval IVw to the left edge of the page PG. Then, the CPU 11 proceeds to step SP21.

In step SP21, the CPU 11 determines whether or not the layout-enabled width DW is greater than or equal to the minimum width threshold. If a positive result is determined, the CPU 11 proceeds to step SP22. In step SP22, the CPU 11 arranges a frame FR whose width is the same as the layout-enabled width DW and whose height is the same as the height H of the target frame FR. Then, the CPU 11 proceeds to step SP4.

If a negative result is determined in step SP21, this means that no new frames FR can be arranged to the left of the target frame FR. In this case, the CPU 11 proceeds to the subroutine SRT4.

In the subroutine SRT4 (FIG. 18), the CPU 11 enters step SP31 from the start step, and determines whether or not a target frame FR has been arranged in the first row on the page PG. If a positive result is determined, the CPU 11 proceeds to step SP32.

In step SP32, the CPU 11 calculates a layout-enabled height DH from a position that is located away from the bottom side of the target frame FR by the interval IVh to the bottom edge of the page PG. Then, the CPU 11 proceeds to step SP33.

In step SP33, the CPU 11 calculates a width that is the same as the width Wa from the right edge to the left edge of the page PG, a width produced by multiplying the width W of the target frame FR by a predetermined magnification factor, and a width that is the same as the width W of the target frame FR. Then, the CPU 11 proceeds to step SP34.

In step SP34, the CPU 11 determines whether or not the layout-enabled height DH is greater than or equal to the minimum height threshold. If a positive result is determined, the CPU 11 proceeds to step SP35. If a negative result is determined, the CPU 11 proceeds to step SP36.

In step SP35, the CPU 11 sets three frame candidates FRC whose widths are equal to the widths calculated in step SP33 and whose heights are the same as the layout-enabled height DH. Then, the CPU 11 proceeds to step SP36.

In step SP36, the CPU 11 determines whether or not the half length of the layout-enabled height DH is greater than or equal to the minimum height threshold. If a positive result is determined, the CPU 11 proceeds to step SP37. If a negative result is determined, the CPU 11 proceeds to step SP38.

In step SP37, the CPU 11 sets three frame candidates FRC whose widths are equal to the widths calculated in step SP33 and whose heights are half the layout-enabled height DH. Then, the CPU 11 proceeds to step SP38.

In step SP38, the CPU 11 determines whether or not the layout-enabled height DH is greater than or equal to the height H of the target frame FR. If a positive result is determined, the CPU 11 proceeds to step SP39. If a negative result is determined, the CPU 11 proceeds to step SP2 (FIG. 16).

In step SP39, the CPU 11 sets three frame candidates FRC whose widths are equal to the widths calculated in step SP33 and whose heights are the same as the height H of the target frame FR. Then, the CPU 11 proceeds to step SP2 (FIG. 16).

If a negative result is determined in step SP31, this means that the target frame FR is located in the second or third row on the page PG. In this case, the CPU 11 proceeds to step SP40.

In step SP40, the CPU 11 determines whether or not the target frame FR is located in the second row on the page PG. Here, if a negative result is determined, this means that the target frame FR is located in the third row on the page PG and that no new frames FR can be arranged below the target frame FR. In this case, the CPU 11 proceeds to step SP2.

If a positive result is determined in step SP40, the CPU 11 proceeds to step SP41, and calculates a layout-enabled height DH from a position that is located away from the bottom side of the target frame FR by the interval IVh to the bottom edge of the page PG. Then, the CPU 11 proceeds to step SP42.

In step SP42, the CPU 11 calculates a width that is the same as the width Wa from the right edge to the left edge of the page PG, a width produced by multiplying the width W of the target frame FR by a predetermined magnification factor, and a width that is the same as the width W of the target frame FR. Then, the CPU 11 proceeds to step SP43.

In step SP43, the CPU 11 determines whether or not the layout-enabled height DH is greater than or equal to the minimum height threshold. If a positive result is determined, the CPU 11 proceeds to step SP44. If a negative result is determined, the CPU 11 proceeds to step SP2.

In step SP44, the CPU 11 sets three frame candidates FRC whose widths are equal to the widths calculated in step SP42 and whose heights are the same as the layout-enabled height DH. Then, the CPU 11 proceeds to step SP2 (FIG. 16).

In step SP2, the CPU 11 displays the frame candidates FRC set in the subroutines SRT3 and SRT4 in the desired location. Then, the CPU 11 proceeds to step SP3.

In step SP3, the CPU 11 determines a frame candidate FRC selected by the user using the cursor CS as a frame FR, and arranges the frame FR in the desired location. Then, the CPU 11 proceeds to step SP4.

In step SP4, the CPU 11 determines whether or not all the frames FR have been arranged on the page PG. If a negative result is determined, this means that any frame FR to be arranged is present. Then, the CPU 11 repeatedly performs the subroutines SRT3 and SRT4 and steps SP2 to SP4.

Figure 15:
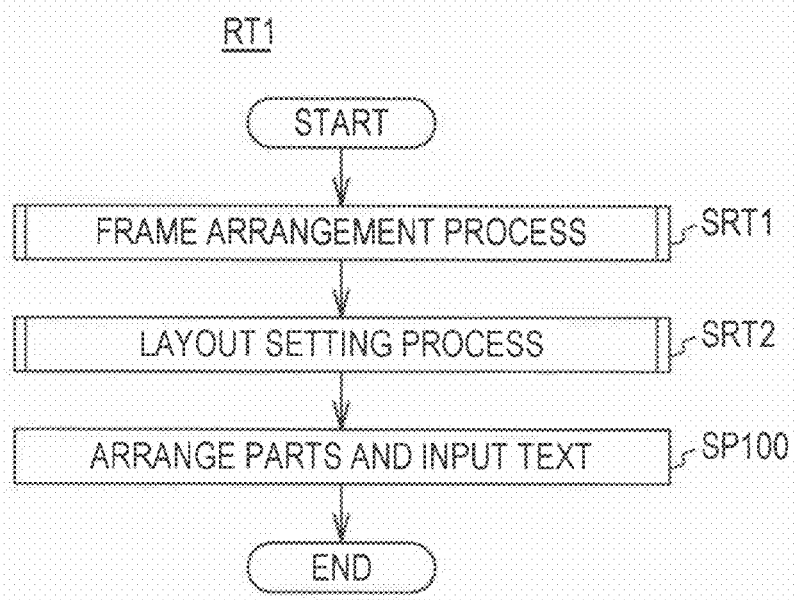
FIG. 15 is a flowchart describing a comic creation process procedure.
Figure 19:
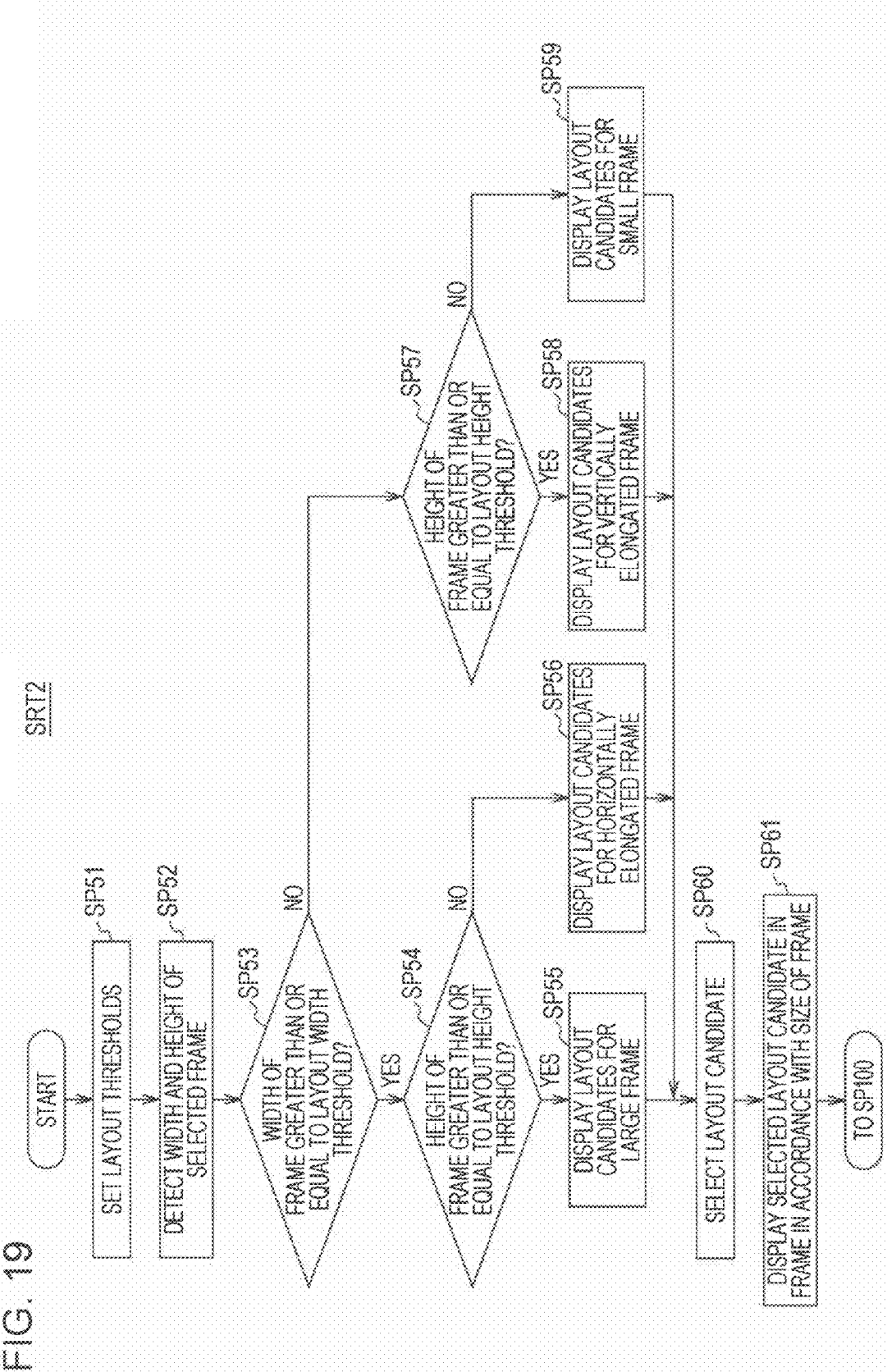
FIG. 19 is a flowchart describing a process procedure for setting layout candidates.

If a positive result is determined in step SP4, this means that all the frames FR have been arranged on the page PG. In this case, the CPU 11 proceeds to a subroutine SRT2 (FIGS. 15 and 19).

In the subroutine SRT2, the CPU 11 enters step SP51 from the start step, and sets the layout width threshold and the layout height threshold to, for example, the values stored in the storage unit 16. Then, the CPU 11 proceeds to step SP52.

In step SP52, the CPU 11 detects the width W and height H of the frame FR selected using the cursor CS. Then, the CPU 11 proceeds to step SP53.

In step SP53, the CPU 11 determines whether or not the width W of the frame FR is greater than or equal to the layout width threshold. If a positive result is determined, the CPU 11 proceeds to step SP54.

In step SP54, the CPU 11 determines whether or not the height H of the frame FR is greater than or equal to the layout height threshold.

If a positive result is determined in step SP54, this means that the selected frame FR is large. Then, the CPU 11 proceeds to step SP55. In step SP55, the CPU 11 displays the layout candidates LA1 to LA6 (FIG. 13) around the selected frame FR. Then, the CPU 11 proceeds to step SP60.

If a negative result is determined in step SP54, this means that the shape of the selected frame FR is horizontally elongated. In this case, the CPU 11 proceeds to step SP56. In step SP56, the CPU 11 displays the layout candidates L1 to L5 (FIG. 11) around the selected frame FR. Then, the CPU 11 proceeds to step SP60.

If a negative result is determined in step SP53, the CPU 11 proceeds to step SP57, and determines whether or not the height H of the frame FR is greater than or equal to the layout height threshold.

If a positive result is determined in step SP57, this means that the shape of the selected frame FR is vertically elongated. In this case, the CPU 11 proceeds to step SP58. In step SP58, the CPU 11 displays the layout candidates L1 to L4 and L6 (FIG. 12) around the selected frame FR. Then, the CPU 11 proceeds to step SP60.

If a negative result is determined in step SP57, this means that the selected frame FR is small. In this case, the CPU 11 proceeds to step SP59. In step SP59, the CPU 11 displays the layout candidates LA1 to LA4 (FIG. 10) around the selected frame FR. Then, the CPU 11 proceeds to step SP60.

In step SP60, the CPU 11 causes the user to select one of the layout candidates LA displayed around the selected frame FR using the cursor CS. Then, the CPU 11 proceeds to step SP61.

In step SP61, the CPU 11 enlarges or reduces the layout candidate LA selected by the user using the cursor CS in accordance with the size of the frame FR, and displays a character CR and a speech balloon SP in the frame FR with the corresponding layout. Then, the CPU 11 proceeds to step SP100 (FIG. 15).

In step SP100, the CPU 11 displays the parts list screen PAG (FIG. 14) on the display unit 15. Then, the CPU 11 causes the user to select a face part and a body part from among the face parts and the body parts displayed on the parts list screen PAG, respectively, by dragging and dropping the face part and the body part to the face and body of the character CR in the frame FR.

Further, when the speech balloon SP in the frame FR is selected using the cursor CS and text is input using the operation input unit 14, the CPU 11 displays the text in the selected speech balloon SP. Then, the CPU 11 proceeds to the subsequent step, and then ends the process.

1-8. Operation and Advantages

In the above configuration, the comic creation apparatus 1 sets frame candidates FRC to be arranged adjacent to a frame FR arranged on a page PG of a comic, and displays the set frame candidates FRC in the desired location on the page PG.

Then, the comic creation apparatus 1 arranges a frame candidate FRC selected using, for example, a cursor CS among the frame candidates FRC displayed on the page PG in the desired location on the page PG as a frame FR.

Thus, the comic creation apparatus 1 is configured to arrange a frame FR in the desired location merely by displaying frame candidates FRC in the desired location around a frame FR and causing a user to select one of the frame candidates FRC. This configuration facilitates easy arrangement of frames FR on the page PG.

Therefore, the comic creation apparatus 1 can easily create a comic without causing a user to perform a time-consuming operation.

Furthermore, the comic creation apparatus 1 is configured to set frame candidates FRC in accordance with frame arrangement rules under which the reading path of the reader is directed.

Accordingly, the comic creation apparatus 1 can create a comic in which frames FR are arranged so as to control the line of sight of the reader to follow the desired path with a simple operation of causing the user to select one frame candidate FRC.

Furthermore, the comic creation apparatus 1 detects the size of a frame FR selected using, for example, the cursor CS on the page PG, and sets candidates of a layout in which a character CR and a speech balloon SP are arranged in accordance with the size of the frame FR as layout candidates LA.

Then, the comic creation apparatus 1 displays the set layout candidates LA around the frame FR, and determines a layout candidate LA selected using, for example, the cursor CS among the layout candidates LA as the layout of the frame FR.

The comic creation apparatus 1 enlarges or reduces the determined layout in accordance with the size of the frame FR, and displays a character CR and a speech balloon SP in the frame FR with the enlarged or reduced layout.

Thus, the comic creation apparatus 1 can determine a layout with a simple operation such as moving the cursor CS to the desired frame FR in which the character CR and the speech balloon SP are to be arranged and selecting one of layout candidates LA displayed around the frame FR.

According to the above configuration, the comic creation apparatus 1 is configured to set and display frame candidates FRC to be arranged adjacent to a frame FR arranged on a page PG of a comic and to arrange a frame candidate FRC selected from among the frame candidates FRC as a frame FR.

Therefore, the comic creation apparatus 1 is configured to arrange a frame FR in the desired location only by causing a user to select one of frame candidates FRC displayed in the desired location around the frame FR. Thus, frames FR can be easily arranged on the page PG, and a comic can therefore be easily created.

2. Other Embodiments

In the foregoing embodiment, description has been given of a case where a frame FR is arranged on a page PG and then the layout of the frame FR is determined.

The present invention is not limited to the foregoing embodiment. For example, the comic creation apparatus 1 may be configured to, in response to an input of a frame FR, display layout candidates LA around the frame FR and to allow a user to select one of the layout candidates LA. Then, when the layout of the frame FR input by the user is determined, the comic creation apparatus 1 displays frame candidates FRC adjacent to the frame FR.

In this manner, the comic creation apparatus 1 may perform in turn the arrangement of a frame FR and the determination of a layout.

In the foregoing embodiment, furthermore, description has been given of a case where in the process of displaying layout candidates LA around a frame FR, a blank frame is used as the frame FR.

The present invention is not limited to the foregoing embodiment. When layout candidates LA are displayed around a frame FR, the comic creation apparatus 1 may display a predetermined layout in the frame FR and also display layout candidates LA around the frame FR. Then, for example, the comic creation apparatus 1 may replace the layout in the frame FR with the layout of a layout candidate LA selected using the cursor CS.

In the foregoing embodiment, furthermore, description has been given of a case where a layout candidate LA to be displayed in a frame FR is determined in accordance with the size of the frame FR. The present invention is not limited to the foregoing embodiment. A layout candidate LA in which a character CR and a speech balloon SP are arranged along the moving path of the line of sight of the user between frames FR may be selected and set.

Specifically, when a frame FR whose layout is determined using the cursor CS is selected, the layout candidate setting unit 41 may detect the size and position of the frame FR, and the size and position of a frame FR adjacent to the frame FR.

Then, for example, if a selected frame FR and frames FR arranged above and below the frame FR have the same width and are located at positions aligned with each other in the horizontal direction, the layout candidate setting unit 41 may determine that the frames FR are read in the vertical direction.

In this case, the layout candidate setting unit 41 may display the layout candidates LA3, LA4, and LA6 in which a character CR and a speech balloon SP are arranged in the vertical direction around the selected frame FR, and may allow the user to select one of the layout candidates LA3, LA4, and LA6.

Further, for example, if a selected frame FR and frames FR arranged above and below the frame FR have different widths and are located at positions displaced with each other in the horizontal direction, the layout candidate setting unit 41 may determine that the frames FR are read in the horizontal direction.

In this case, the layout candidate setting unit 41 may display the layout candidates LA1, LA2, and LA5 in which a character CR and a speech balloon SP are arranged in the horizontal direction around the selected frame FR, and may allow the user to select one of the layout candidates LA1, LA2, and LA5.

Therefore, the comic creation apparatus 1 can determine a layout in the frame FR so that the direction in which the line of sight of the reader moves between frames FR can be made identical to the direction in which the reader reads a character CR and a speech balloon SP. Therefore, the comic creation apparatus 1 can easily create a comic while taking the reading path of the reader into account.

In the foregoing embodiment, furthermore, description has been given of a case where in a frame arrangement rule, the number of frames is less than or equal to three vertical frames by three horizontal frames, that is, nine frames. The present invention is not limited to the foregoing embodiment, and, in an embodiment, for example, four vertical frames by four horizontal frames, that is, 12 frames, may be used.

In the foregoing embodiment, furthermore, description has been given of a case where in a frame arrangement rule, the line of sight of the reader between frames FR can be controlled to move in the horizontal and vertical directions. The present invention is not limited to the foregoing embodiment, and, in an embodiment, for example, frames FR arranged vertically may have different widths and may be located at positions displaced with each other in the horizontal direction so as to direct the reading path between frames FR only in the horizontal direction.

In the foregoing embodiment, furthermore, description has been given of a case where the CPU 11 performs the various processes described above in accordance with programs stored in the storage unit 16. The present invention is not limited to the foregoing embodiment, and, in an embodiment, the various processes described above may be performed in accordance with programs installed from storage media or downloaded via the Internet. In addition, the various processes described above may be performed in accordance with programs installed in a variety of other routes.

In the foregoing embodiment, moreover, description has been given of a case where the frame candidate setting unit 31 serves as a frame candidate setting unit, the frame candidate display unit 32 serves as a frame candidate display unit, and the frame determination unit 33 serves as a frame determination unit. The present invention is not limited to the foregoing embodiment, and, in an embodiment, the frame candidate setting unit, the frame candidate display unit, and the frame determination unit may have other various configurations.

Embodiments of the present invention can be used in various electronic apparatuses including a personal computer, a mobile phone, a personal digital assistant (PDA), a portable music player, and a game console.

The present application contains subject matter related to that disclosed in Japanese Priority Patent Application JP 2009-277848 filed in the Japan Patent Office on Dec. 7, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A comic creation apparatus, comprising:
    a processor configured to execute a comic creation program that causes the processor to function as:
    a frame candidate setting unit configured to set a plurality of frame candidates of different sizes that can be arranged immediately adjacent to a first frame arranged on a page of a comic;
    a frame candidate display unit configured to display each of the plurality of frame candidates in a corresponding location on the page;
    a frame determination unit configured to arrange one frame candidate of the plurality of frame candidates, which is selected from among the plurality of frame candidates displayed on the page, in the corresponding location on the page as a second frame and erase each of the plurality of frame candidates other than the one selected frame candidate; and a layout candidate setting unit configured to set layout candidates in which a character and a speech balloon are arranged along a movement path of a line of sight of a user that moves between frames in accordance with a positional relationship between the selected frame and frames arranged around the selected frame.

2. The comic creation apparatus according to claim 1, wherein the frame candidate setting unit sets the plurality of frame candidates in accordance with a predetermined rule under which frames are arranged so as to control the line of sight of the user to follow a desired path of frames.

3. The comic creation apparatus according to claim 1, wherein the frame candidate setting unit sets the plurality of frame candidates to be arranged adjacent to a frame input to a blank page via an operation input unit that receives a user operation.

4. The comic creation apparatus according to claim 1, wherein the layout candidate setting unit is configured to detect a size of a frame selected from among frames arranged on the page and to set the layout candidates for positioning the character and the speech balloon in accordance with the size of the frame the comic creation apparatus further comprising:
a layout candidate display unit configured to display the layout candidates set by the layout candidate setting unit around the selected frame; and
a layout determination unit configured to determine, as a layout of the selected frame, a layout candidate selected from among the layout candidates displayed around the selected frame.

5. The comic creation apparatus of claim 1, wherein the frame candidate display unit is configured to display the plurality of frame candidates in an overlapping manner on the page.

6. The comic creation apparatus of claim 1, wherein the frame determination unit is configured to arrange the one frame candidate in response to selection of the one frame candidate by a user using a cursor.

7. The comic creation apparatus of claim 1, wherein the frame candidate setting unit is configured to set a first frame candidate having a same width as the first frame and a second frame candidate having a width equal to an available width in a row of the first frame.

8. A comic creation method executed by a computer to perform steps comprising:
setting, a plurality of frame candidates of different sizes that can be arranged immediately adjacent to a first frame arranged on a page of a comic;
displaying each of the plurality of frame candidates in a corresponding location on the page;
arranging one frame candidate of the plurality of frame candidates, which is selected from among the plurality of frame candidates displayed on the page, in the corresponding location on the page as a second frame;
erasing each of the plurality of frame candidates other than the one selected frame candidate; and
setting layout candidates in which a character and a speech balloon are arranged along a movement path of a line of sight of a user that moves between frames in accordance with a positional relationship between the selected frame and frames arranged around the selected frame.

9. A non-transitory computer-readable medium storing a comic creation program for causing a computer to execute the steps of:
setting a plurality of frame candidates of different sizes that can be arranged immediately adjacent to a first frame arranged on a page of a comic;
displaying each of the plurality of frame candidates in a corresponding location on the page;
arranging one frame candidate of the plurality of frame candidates, which is selected from among the plurality of frame candidates displayed on the page, in the corresponding location on the page as a second frame;
erasing each of the plurality of frame candidates other than the one selected frame candidate; and
setting layout candidates in which a character and a speech balloon are arranged along a movement path of a line of sight of a user that moves between frames in accordance with a positional relationship between the selected frame and frames arranged around the selected frame.

10. A comic creation apparatus, comprising:
a processor configured to execute a comic creation program that causes the processor to function as:
a frame candidate setting unit configured to set a plurality of frame candidates of different sizes that can be arranged immediately adjacent to a first frame arranged on a page of a comic;
a frame candidate display unit configured to display each of the plurality of frame candidates in a corresponding location on the page; and
a frame determination unit configured to arrange one frame candidate of the plurality of frame candidates, which is selected from among the plurality of frame candidates displayed on the page, in the corresponding location on the page as a second frame,
the comic creation apparatus further comprising:
a layout candidate setting unit configured to detect a size of a frame selected from among frames arranged on the page and to set layout candidates for positioning a character and a speech balloon in accordance with a size of the frame;
a layout candidate display unit configured to display the layout candidates set by the layout candidate setting unit around the selected frame; and
a layout determination unit configured to determine, as a layout of the selected frame, a layout candidate selected from among the layout candidates displayed around the selected frame,
wherein the layout candidate setting unit sets layout candidates in which the character and the speech balloon are arranged along a movement path of a line of sight of a user that moves between frames in accordance with a positional relationship between the selected frame and frames arranged around the selected frame.

* * * * *